US012528897B2

(12) United States Patent
Wu et al.

(10) Patent No.: US 12,528,897 B2
(45) Date of Patent: Jan. 20, 2026

(54) ALPHA-OLEFIN INTERPOLYMERS WITH IMPROVED MOLECULAR DESIGN FOR PHOTOVOLTAIC ENCAPSULANTS

(71) Applicant: DOW GLOBAL TECHNOLOGIES LLC, Michigan, MI (US)

(72) Inventors: Gaoxiang Wu, Lake Jackson, TX (US); Brian M. Habersberger, Lake Jackson, TX (US); Johnathan E. DeLorbe, Lake Jackson, TX (US); Thomas Wesley Karjala, Jr., Lake Jackson, TX (US); Yabin Sun, Shanghai (CN); Rongjuan Cong, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 757 days.

(21) Appl. No.: 17/773,582

(22) PCT Filed: Dec. 17, 2020

(86) PCT No.: PCT/US2020/065761
§ 371 (c)(1),
(2) Date: Apr. 29, 2022

(87) PCT Pub. No.: WO2021/133640
PCT Pub. Date: Jul. 1, 2021

(65) Prior Publication Data
US 2022/0389139 A1 Dec. 8, 2022

(30) Foreign Application Priority Data

Dec. 26, 2019 (WO) ................ PCT/CN2019/128574

(51) Int. Cl.
*C08F 210/16* (2006.01)
*C08J 5/18* (2006.01)
*G01N 30/14* (2006.01)
*G01N 30/86* (2006.01)
*H10F 19/80* (2025.01)

(52) U.S. Cl.
CPC .............. *C08F 210/16* (2013.01); *C08J 5/18* (2013.01); *G01N 30/14* (2013.01); *G01N 30/8631* (2013.01); *H10F 19/804* (2025.01); *C08F 2500/03* (2013.01); *C08F 2500/09* (2013.01); *C08F 2810/20* (2013.01); *C08J 2323/18* (2013.01)

(58) Field of Classification Search
CPC .............. C08F 210/16; C08F 2500/03; C08F 2500/28; C08F 2500/29; C08F 4/64193; C08F 4/659; C08F 4/65908
See application file for complete search history.

(56) References Cited

U.S. PATENT DOCUMENTS

| 5,849,823 | A | 12/1998 | Kale et al. |
| 6,369,176 | B1 | 4/2002 | Laughner et al. |
| 6,451,894 | B1 | 9/2002 | Srinivasan et al. |
| 8,581,094 | B2 | 11/2013 | Patel et al. |
| 8,609,794 | B2* | 12/2013 | Klosin ................. C08F 210/16 526/170 |
| 8,697,984 | B2 | 4/2014 | Amamiya et al. |
| 9,029,487 | B2 | 5/2015 | Klosin et al. |
| 9,102,819 | B2* | 8/2015 | Kapur .................... C08L 23/08 |
| 9,349,895 | B2 | 5/2016 | Ikenaga et al. |
| 9,361,059 | B2* | 6/2016 | Swan ..................... G09F 9/3026 |
| 9,534,070 | B2* | 1/2017 | Spencer .................... C07F 7/00 |
| 9,587,094 | B2 | 3/2017 | Maeyama et al. |
| 9,828,476 | B2* | 11/2017 | Bensason ................ B32B 27/32 |
| 9,975,975 | B2 | 5/2018 | Ewart et al. |
| 11,161,969 | B2* | 11/2021 | Demirors ............. C08F 210/16 |
| 2011/0290317 | A1 | 12/2011 | Naumovitz et al. |
| 2012/0264889 | A1 | 10/2012 | Takaoki et al. |
| 2013/0167911 | A1 | 7/2013 | Ikenaga et al. |
| 2013/0233383 | A1 | 9/2013 | Naumovitz et al. |
| 2013/0324671 | A1 | 12/2013 | Kataoka et al. |
| 2016/0115264 | A1 | 4/2016 | Rohatgi et al. |
| 2017/0005214 | A1 | 1/2017 | Yoshitake et al. |
| 2019/0276573 | A1 | 9/2019 | Carnahan et al. |
| 2020/0247936 | A1 | 8/2020 | Devore et al. |
| 2021/0238398 | A1 | 8/2021 | Kim et al. |

FOREIGN PATENT DOCUMENTS

| CN | 104263258 A | 1/2015 |
| CN | 105950039 A | 9/2016 |

(Continued)

OTHER PUBLICATIONS

PCT/CN2019/128574, International Search Report and Written Opinion with a mailing date of Dec. 26, 2019.
PCT/US2020/065761, International Search Report and Written Opinion with a mailing date of May 31, 2021.
PCT/US2020/065761, International Preliminary Report on Patentability with a mailing date of Jun. 28, 2022.

*Primary Examiner* — Rip A Lee

(57) ABSTRACT

A composition comprising an ethylene/alpha-olefin interpolymer that comprises the following properties: a) a total unsaturation/1000C≥0.30; b) a molecular weight distribution (MWD)≤3.0; c) a TGIC broadness parameter $B_{1/4} \leq 8.0$. A solution polymerization process to prepare an ethylene/alpha-olefin/interpolymer, said process comprising polymerizing, in one reactor, at a reactor temperature ≥150° C., a reaction mixture comprising ethylene, an alpha-olefin, a solvent, and a metal complex as described herein. A method to determine the TGIC broadness parameter $B_{1/x}$ of a polymer composition comprising one or more olefin-based polymers.

14 Claims, 3 Drawing Sheets

(56) References Cited

FOREIGN PATENT DOCUMENTS

| | | | |
|---|---|---|---|
| CN | 106189932 | A | 12/2016 |
| CN | 106811150 | A | 6/2017 |
| EP | 2637217 | B1 | 3/2016 |
| EP | 2993704 | A1 | 3/2016 |
| EP | 2958151 | B1 | 10/2018 |
| JP | 2012009688 | A | 1/2012 |
| JP | 2014168091 | | 9/2014 |
| WO | 2002074817 | A2 | 9/2002 |
| WO | 2016014749 | | 1/2016 |
| WO | 2018022975 | | 2/2018 |
| WO | 2018170208 | A1 | 9/2018 |
| WO | 2019000744 | | 1/2019 |
| WO | 2021128127 | A | 7/2021 |
| WO | 2021128128 | A | 7/2021 |
| WO | 2021133613 | A | 7/2021 |

\* cited by examiner

ALPHA-OLEFIN INTERPOLYMERS WITH IMPROVED MOLECULAR DESIGN FOR PHOTOVOLTAIC ENCAPSULANTS

CROSS-REFERENCE TO RELATED APPLICATIONS

This application claims priority to international application no. PCT/CN2019/128574, filed on Dec. 26, 2019, which is incorporated herein by reference in its entirety.

BACKGROUND OF THE INVENTION

Polymers designed for photovoltaic encapsulants must satisfy many requirements. In order to prevent movement of electrical components and wiring during qualification testing and use, polymeric materials must not flow significantly at temperatures up to 85° C. One way to accomplish this, is to include a semicrystalline polymer with a melting point above this temperature. However, other encapsulating material requirements, such as high optical clarity and low modulus, are optimized with low-crystallinity polymers. To balance these requirements, typically low-crystallinity polymers, such as ethylene-vinyl acetate copolymers (EVAs) or polyolefin elastomers (POEs), are used in conjunction with a peroxide-based reactive curing package. The low crystallinity polymers provide high clarity and low modulus, while the curing package facilitates a crosslinking reaction that causes the polymer to form a network, providing mechanical stability at high temperatures. This crosslinking reaction takes place during module lamination, typically conducted at 150° C.

The inclusion of this peroxide curing package creates an additional design conflict, since the film extrusion process must be conducted at a low temperature, in order to prevent the peroxide from decomposing and initiating the crosslinking reaction in the extruder. Heat generation during extrusion is related to the rate of extrusion and the polymer viscosity; high viscosity and high extrusion rates generate more heat. Therefore, to extrude a peroxide-curing composition, a low viscosity resin, extruded at low rates, is preferred. However, low extrusion rates are economically disadvantageous, and low viscosity is typically achieved via the use of a low molecular weight resin. Ordinarily, low molecular weight resins cannot be crosslinked efficiently, and require a higher loading of the peroxide curing package or longer times in the module lamination process, in order to reach the necessary level of crosslinking. Both of these solutions are costly and inefficient.

There is a need for new polymers that can be extruded at high rates and crosslinked to high degrees, each relative to the conventional polymers used for photovoltaic encapsulants. EP2958151B1 discloses resin compositions for solar cell encapsulants, and which are disclosed as having good crosslinking, good heat resistance and good transparency. The resin composition contains an ethylene/alpha-olefin copolymer that meets the following relationship: N×V≥10, where N is a branch number derived from the comonomer, and V is the total number of vinyl and vinylidene in the copolymer (see, for example, paragraphs [0030] and [0031]). Here, V is greater than, or equal to, 0.17. See also, JP2012009688A (machine translation), which discloses a solar sealing composition containing an ethylene/alpha-olefin copolymer that has a total amount of unsaturation (vinyl, vinylidene, cis and trans vinylene, tri-substituted vinylene) of 0.22; a density of 0.860 to 0.920 g/cc; and a Mz/Mn less than, or equal to, 8.0. Additional polymer compositions for solar encapsulants are disclosed in the following references: EP2637217B1 (composition containing an ethylene/alpha-olefin copolymer that comprises, in part, a MFR from 2 to less than 10, a density from 0.865 to 0.884 g/cc, and a Shore A hardness from 60 to 85; and where the MWD can be from 1.2 to 3.5), and U.S. Pat. No. 8,581,094 (composition containing a polyolefin copolymer comprising, in part, a density less than about 0.90 g/cc, a melting point less than about 95° C., and a 2% secant modulus less than about 150 Mega-Pascal). However, these references do not promote a new resin design to achieve high extrusion rates and high degrees of crosslinking. There remains a need for such compositions that promote high extrusion rates and high degrees of crosslinking. This need has been met by the invention.

SUMMARY OF THE INVENTION

A composition comprising an ethylene/alpha-olefin interpolymer that comprises the following properties:
  a) a total unsaturation/1000C≥0.30;
  b) a molecular weight distribution (MWD)≤3.0;
  c) a TGIC broadness parameter $B_{1/4}$≤8.0.

A solution polymerization process to prepare an ethylene/alpha-olefin/interpolymer; said process comprising polymerizing, in one reactor, at a reactor temperature ≥150° C., a reaction mixture comprising ethylene, an alpha-olefin, a solvent, and a metal complex selected from a) below:
  a) a biphenyl phenol metal complex selected from the following Structure 1:

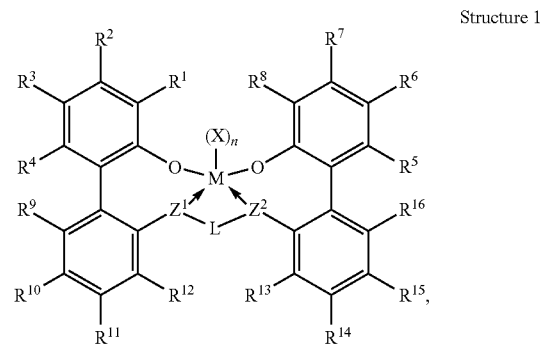

Structure 1

M is Zr or Hf, the metal being in a formal oxidation state of +2, +3, or +4;

n is 0, 1, or 2;

when n is 1, X is a monodentate ligand or a bidentate ligand;

when n is 2, each X is an independently chosen monodentate ligand;

the metal complex is overall charge-neutral;

each of —$Z^1$— and —$Z^2$— is independently selected from —O—, —S—, —N($R^N$)—, or —P($R^P$)—;

$R^1$ and $R^8$ are independently selected from the group consisting of —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N(R)—, ($R^C$)$_2$NC(O)—, halogen, radicals having formula (I), radicals having formula (II), and radicals having formula (III):

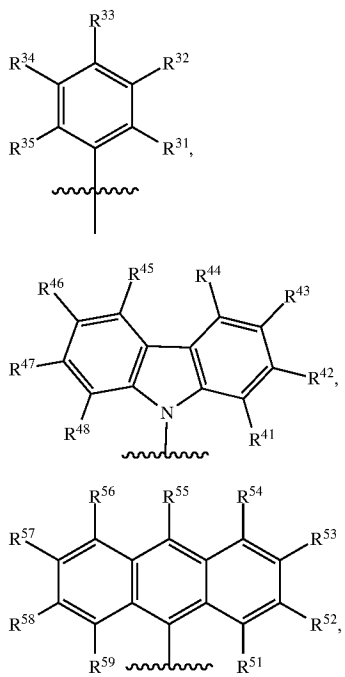

where each of $R^{31-35}$, $R^{41-48}$, and $R^{51-59}$ is independently selected from $(C_1-C_{40})$hydrocarbyl, $(C_1-C_{40})$heterohydrocarbyl, $-Si(R^C)_3$, $-Ge(R^C)_3$, $-P(R^P)_2$, $-N(R^N)_2$, $-N=CHR^C$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R^N)-$, $(R^C)_2NC(O)-$, halogen, or $-H$;

each of $R^{2-7}$, $R^{9-16}$ is independently selected from $(C_1-C_{40})$hydrocarbyl, $(C_1-C_{40})$heterohydrocarbyl, $-Si(R^C)_3$, $-Ge(R^C)_3$, $-P(R^P)_2$, $-N(R^N)_2$, $-N=CHR^C$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R^N)-$, $(R^C)_2NC(O)-$, halogen, or $-H$;

L is $(C_1-C_{40})$hydrocarbylene or $(C_1-C_{40})$heterohydrocarbylene, wherein the $(C_1-C_{40})$hydrocarbylene has a portion that comprises a 1-carbon atom to 10-carbon atom linker backbone, linking the two Z groups in Structure 1 (to which L is bonded); or the $(C_1-C_{40})$heterohydrocarbylene has a portion that comprises a 1-atom to 10-atom linker backbone, linking the two Z groups in Structure 1, wherein each of the 1 to 10 atoms of the 1-atom to 10-atom linker backbone of the $(C_1-C_{40})$ heterohydrocarbylene, independently, is a carbon atom or heteroatom group, wherein each heteroatom group independently is O, S, S(O), S(O)2, Si(R^C)2, Ge(R^C)2, P(R^C), or N(R^C); and each $R^C$, $R^P$, and $R^N$ in Structure 1 is independently a $(C_1-C_{30})$hydrocarbyl, a $(C_1-C_{30})$heterohydrocarbyl, or $-H$.

A method to determine the TGIC broadness parameter $B_{1/x}$ of a polymer composition, comprising one or more olefin-based polymers; said the method comprising the following steps:

a) dissolving the polymer composition in an organic solvent to form a polymer solution;
b) injecting at least a portion of the polymer solution onto a column comprising a support material that comprises graphite;
c) cooling the support material at a rate greater than, or equal to, 0.1° C./min;
d) increasing the temperature of the support material to elute the polymer(s) of the polymer composition;
e) generating a "dwi/dT versus temperature" profile;
f) for the maximum height of the profile (dwi/dTi versus temperature), calculating the width of the profile at 1/x of the maximum height, where x>1;
g) determining the temperature (Tp) at the maximum height of the profile;
h) calculating the peak width of an HDPE (at a elution temperature of 150.0° C.) at 1/x of the HDPE peak height (PeakWidth@1/x) from an EICOSANE/iPP/HDPE reference; and wherein the reference is analyzed by TGIC in accordance with steps a) through g);
i) calculating the Bar based on following equation:

$$B_{1/x} = \frac{\text{Profile width}\left(\text{at } \frac{1}{x} \text{ maximum height}\right)}{\text{Peak Width @} \frac{1}{x} \text{ of } HDPE} \times \frac{Tp}{150°C}.$$

DETAILED DESCRIPTION OF THE INVENTION

Figure 1:
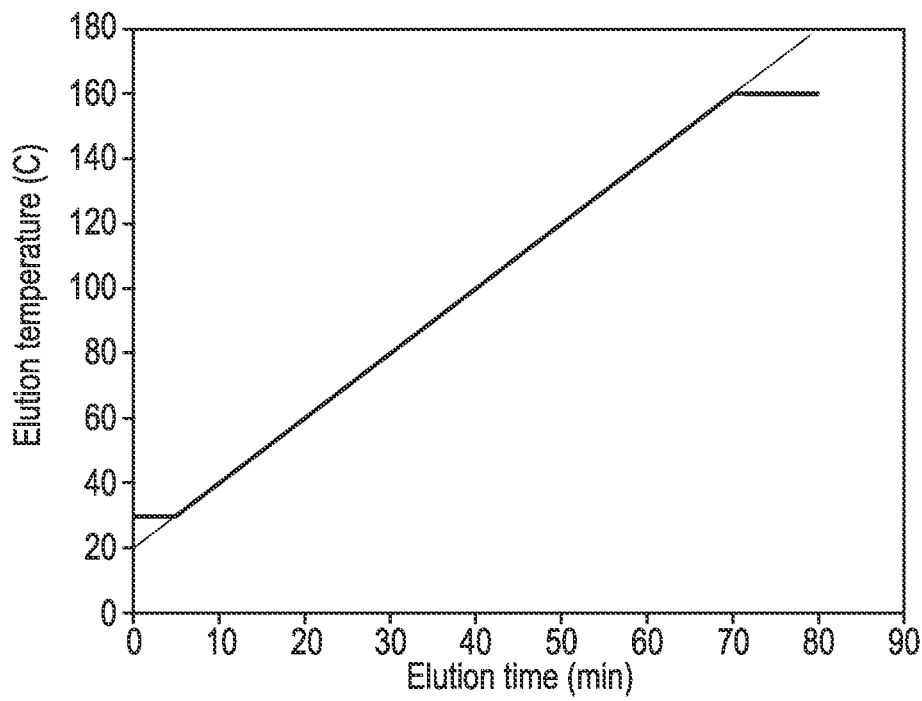
FIG. 1 depicts the extrapolation of the elution temperature for TGIC temperature calibration. The solid line is experimental data, and the dashed line is the extrapolation of elution temperature for two isothermal steps.

An ethylene/alpha-olefin/interpolymer design has been discovered that provides improved curing performance and good extrudability. It has also been discovered that a higher vinyl fraction in the total unsaturation and a narrow comonomer distribution in the interpolymer provide for improved adhesion to glass.

As discussed, a composition is provided, which comprises an ethylene/alpha-olefin interpolymer that comprises the following properties:
a) a total unsaturation/1000C≥0.30;
b) a molecular weight distribution (MWD)≤3.0;
c) a TGIC broadness parameter $B_{1/4}$≤8.0.

The above composition may comprise a combination of two or more embodiments, as described herein. The ethylene/alpha-olefin interpolymer may comprise a combination of two or more embodiments, as described herein.

The above TGIC broadness parameter. $B_{1/4}$, is an indication of the breath of the comonomer distribution of the ethylene/alpha-olefin interpolymer. A smaller $B_{1/4}$ value indicates a narrower comonomer distribution. In one embodiment, or a combination of two or more embodiments, each described herein, the TGIC broadness parameter $B_{1/4}$ is ≤7.5, or ≤7.0, or ≤6.5, or ≤6.0, or ≤5.5, or ≤5.0, or ≤4.8, or ≤4.6, or ≤4.4, or ≤4.2, or ≤4.0, or ≤3.8. In one embodiment, or a combination of two or more embodiments, each described herein, the TGIC broadness parameter $B_{1/4}$ is ≥1.5, or ≥2.0, or ≥2.2, or ≥2.4, or ≥2.6, or ≥2.8, or ≥3.0, or ≥3.2.

In one embodiment, or a combination of two or more embodiments, each described herein, the ethylene/alpha-olefin interpolymer has a density ≥0.860 g/cc, or ≥0.861 g/cc, or ≥0.862 g/cc, or ≥0.863 g/cc, or ≥0.864 g/cc, or ≥0.865 g/cc, or ≥0.866 g/cc, or ≥0.867 g/cc, or ≥0.868 g/cc, or ≥0.869 g/cc, or ≥0.870 g/cc (1 cc=1 cm$^3$). In one embodiment, or a combination of two or more embodiments, each described herein, the ethylene/alpha-olefin interpolymer has a density ≤0.900 g/cc, or ≤0.890 g/cc, or ≤0.888 g/cc, or ≤0.886 g/cc, or ≤0.885 g/cc, or ≤0.884 g/cc, or ≤0.883 g/cc, or ≤0.882 g/cc, or ≤0.880 g/cc, or ≤0.878 g/cc.

In one embodiment, or a combination of two or more embodiments, each described herein, the ethylene/alpha-olefin interpolymer has a total unsaturation/1000C≥0.32, or ≥0.35, or ≥0.40, or ≥0.45, or ≥0.50, or ≥0.52, or ≥0.54, or ≥0.56. In one embodiment, or a combination of two or more embodiments, each described herein, the ethylene/alpha-olefin interpolymer has a total unsaturation/1000C≤1.00, or ≤0.95, or ≤0.90, or ≤0.85, or ≤0.80, or ≤0.78, or ≤0.76, or ≤0.74, or ≤0.72, or ≤0.70.

In one embodiment, or a combination of two or more embodiments, each described herein, the ethylene/alpha-olefin interpolymer has a molecular weight distribution (MWD=Mw/Mn)≥1.6, or ≥1.7, or ≥1.8, or ≥1.9, or ≥2.0. In one embodiment, or a combination of two or more embodiments, each described herein, the ethylene/alpha-olefin interpolymer has a molecular weight distribution MWD≤2.9, or ≤2.8, or ≤2.7, or ≤2.6, or ≤2.5, or ≤2.4, or ≤2.3, or ≤2.2.

In one embodiment, or a combination of two or more embodiments, each described herein, the interpolymer further comprises a product of the [(vinyl/1000C)*(Mn)] is ≥5.0×10$^3$ (g/mol), or ≥6.0×10$^3$ (g/mol), ≥7.0×10$^3$ (g/mol), ≥7.5×10$^3$ (g/mol), or ≥8.0×10$^3$ (g/mol), or ≥8.5×10$^3$ (g/mol), or ≥9.0×10$^3$ (g/mol), or ≥9.5×10$^3$ (g/mol) or ≥10×10$^3$ (g/mol). In one embodiment, or a combination of two or more embodiments, each described herein, the interpolymer further comprises a product of the [(vinyl/1000C)*(Mn)] is ≤30×10$^3$ (g/mol), or ≤20×10$^3$ (g/mol), or ≤18×10$^3$ (g/mol), or ≤16×10$^3$ (g/mol) or ≤14×10$^3$ (g/mol), or ≤12×10$^3$ (g/mol).

In one embodiment, or a combination of two or more embodiments, each described herein, the interpolymer further comprises a ratio of the [(vinyl/1000C)/(vinylidene/1000C)] is ≥2.0, or ≥2.2, or ≥2.4, or ≥2.6, or ≥2.8, or ≥3.0, or ≥3.1, or ≥3.2, or ≥3.3, or ≥3.4. In one embodiment, or a combination of two or more embodiments, each described herein, the interpolymer further comprises a ratio of the [(vinyl/1000C)/(vinylidene/1000C)] is ≤6.0, or ≤5.5, or ≤5.0, or ≤4.8, or ≤4.6, or ≤4.4, or ≤4.2, or ≤4.0, or ≤3.8.

In one embodiment, or a combination of two or more embodiments, each described herein, the ethylene/alpha-olefin interpolymer further comprises a % vinyl ≥50%, or ≥52%, or ≥54%, or 56%, or ≥58%, or ≥60%, or ≥62%. The % Vinyl=[(Vinyl/1000C)/(Total Unsat./1000C)]×100.

In one embodiment, or a combination of two or more embodiments, each described herein, the composition further comprises a peroxide and a silane coupling agent. In one embodiment, or a combination of two or more embodiments, each described herein, the composition further comprises a crosslinking coagent.

Also provided is an article comprising at least one component formed from the composition of any one embodiment, or a combination of two or more embodiments, each described herein. In one embodiment, or a combination of two or more embodiments, each described herein, the article is a film. In one embodiment, or a combination of two or more embodiments, each described herein, the article is a solar cell module.

The ethylene/alpha-olefin interpolymer comprises, in polymerize form, ethylene, and an alpha-olefin. The alpha-olefin may be either an aliphatic or an aromatic compound. The alpha-olefin is preferably a $C_3$-$C_{20}$ aliphatic compound, preferably a $C_3$-$C_{16}$ aliphatic compound, and more preferably a $C_3$-$C_{10}$ aliphatic compound. Preferred $C_3$-$C_{10}$ aliphatic alpha-olefins include propylene, 1-butene, 1-hexene, 1-octene and 1-decene, and more preferably 1-octene.

Peroxides (containing at least one "—O—O—" group), are preferably organic peroxides, such as, for example, t-butylperoxy-2-ethylhexyl carbonate; di-t-butyl peroxide; t-butyl-cumyl peroxide; dicumyl peroxide; 2,5-dimethyl-2,5-di-(t-butylperoxy) hexane; di-(t-butyl-peroxy-isopropyl) benzene; t-butyl peroxybenzoate; 1,1-di-(t-butylperoxy)-3,3,5-trimethyl-cyclohexane; 2,5-dimethyl-2,5-di(t-amylperoxy)-hexane; 2,5-dimethyl-2,5-di(t-butyl-peroxy) hexyne-3,2,5-dimethyl-2,5-di(t-amylperoxy)hexyne-3; di-t-amyl peroxide; 1,3-dimethyl-3-(t-butyl-peroxy)butanol; 1,3-dimethyl-3-(t-amylperoxy)butanol; and mixtures of two or more of these initiators. See, for example, TRIGONOX peroxides from AkzoNobel, LUPEROX peroxides from ARKEMA.

Silane coupling agents include, but are not limited to, vinyltrimethoxysilane and 3-(trimethoxysilyl) propylmethacrylate. Crosslinking coagents include, but are not limited to, triallyl cyanurate, triallyl phosphate, triallyl isocyanurate, and 1,3,5,7-tetravinyl-1,3,5,7-tetramethylcyclotetrasiloxane. An inventive composition may also comprise one or more additives, such as UV stabilizers, antioxidants, and combinations thereof.

In one embodiment, or a combination of two or more embodiments, each described herein, an inventive composition further comprises a thermoplastic polymer, different from the ethylene/alpha-olefin interpolymer in one or more features, such as monomer(s) types and/or amounts, Mn, Mw, Mz, MWD, V0.1, V100, RR (V0.1/V100), or any combination thereof. Polymers include, but not limited to, ethylene-based polymers, propylene-based polymers, and olefin multi-block interpolymers. Suitable ethylene-based polymers include, but are not limited to, linear low density polyethylene (LLDPE), very low density polyethylene (VLDPE), ultra-low density polyethylene (ULDPE), homogeneously branched linear ethylene-based polymers, and homogeneously branched substantially linear ethylene-based polymers (that is homogeneously branched, long chain branched ethylene polymers). Examples of propylene-based polymers include polypropylene homopolymers and propylene/ethylene copolymers.

Also provided is a solution polymerization process to prepare an ethylene/alpha-olefin/interpolymer; said process comprising polymerizing, in one reactor, at a reactor temperature ≥150° C. a reaction mixture comprising ethylene, an alpha-olefin, a solvent, and a metal complex selected from Structure 1, as described in the above Summary of the Invention (SOI).

The inventive process may comprise a combination of two or more embodiments, as described herein. The biphenyl phenol metal complex may comprise a combination of two or more embodiments, as described herein. As used herein, R1=$R^1$, R2=$R^2$, R3=$R^3$, and so forth. Also, the notation $R^{a(1)}$-$R^{a(n)}$, where "a(1) through a(n)" represents consecutive numbers, refers to $R^{a(1)}$, $R^{a(2)}$, $R^{a(3)}$, ..., $R^{a(n)}$. For example, $R^{31}$—$R^{35}$ refers to $R^{31}$, $R^{32}$, $R^{33}$, $R^{34}$, $R^{35}$; and $R^{51}$—$R^{59}$ refers to $R^{51}$, $R^{52}$, $R^{53}$, $R^{54}$, $R^{55}$, $R^{56}$, $R^{57}$, $R^{58}$, $R^{59}$. In each of formulas (I)-(III), the wavy line denotes an attachment (bond) between the respective formula ($R^1$ or $R^8$ group) and the remainder of the biphenyl phenol metal complex.

In one embodiment, or a combination of two or more embodiments, each described herein, for Structure 1, L is either —(CH$_2$)$_n$—, where n=2 to 4; —CH$_2$C(R$^a$R$^b$)CH$_2$—, where R$^a$ and R$^b$ are each independently (C$_1$-C$_{40}$)hydrocarbyl, (C$_1$-C$_{40}$)heterohydrocarbyl, or —H; or —CH$_2$Ge(R$^D$)$_2$CH$_2$— or —CH$_2$Si(R$^D$)$_2$CH$_2$—, where each R$^D$ is independently selected from the group consisting of —H, (C$_1$-C$_{40}$)hydrocarbyl, (C$_1$-C$_{40}$)heterohydrocarbyl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N(R$^N$)—, and (R$^N$)$_2$NC(O)—, and where each R$^C$, R$^P$, and R$^N$ in Structure 1 is independently a (C$_1$-C$_{30}$)hydrocarbyl, a (C$_1$-C$_{30}$)heterohydrocarbyl, or —H.

In one embodiment, or a combination of two or more embodiments, each described herein, for Structure 1, L is either —CH$_2$C(R$^a$R$^b$)CH$_2$—, where R$^a$ and R$^b$ are each independently (C$_1$-C$_{40}$)hydrocarbyl, (C$_1$-C$_{40}$)heterohydrocarbyl, or —H; or —CH$_2$Ge(R$^D$)$_2$CH$_2$— or —CH$_2$Si(R$^D$)$_2$CH$_2$—, where each R$^D$ is independently selected from the group consisting of —H, (C$_1$-C$_{40}$)hydrocarbyl and (C$_1$-C$_{40}$)heterohydrocarbyl.

In one embodiment, or a combination of two or more embodiments, each described herein, for Structure 1, each of —Z$^1$— and —Z$^2$— is —O—.

In one embodiment, or a combination of two or more embodiments, each described herein, for Structure 1, R$^1$ and R$^8$ are identical, and selected from the group consisting of radicals having formula (I), radicals having formula (II), and radicals having formula (III), and further from radicals having formula (II).

In one embodiment, or a combination of two or more embodiments, each described herein, for Structure 1, n=2, and each X is the same, and is an unsubstituted alkyl.

In one embodiment, or a combination of two or more embodiments, each described herein, the reaction mixture further comprises a cocatalyst-1 that comprises a borate, and a cocatalyst-2 that comprises an alumoxane.

In one embodiment, or a combination of two or more embodiments, each described herein, the process has an overall catalyst efficiency ≥2.5×10$^6$, or ≥2.6×10$^6$, or ≥2.8×10$^6$, or ≥3.0×10$^6$, or ≥3.2×10$^6$, or ≥3.4×10$^6$, or ≥3.6×10$^6$, or ≥3.7×10$^6$, or ≥3.8×10$^6$, or ≥3.9×10$^6$, or ≥4.0×10$^6$, or ≥4.1×10$^6$, or ≥4.2×10$^6$ [(gram interpolymer) per (gram total catalyst metal)], at a reactor temperature 155° C., or ≥160° C., or ≥165° C., or ≥170° C., or ≥175° C., or ≥180° C., or ≥185° C., or ≥186° C., or 187° C., or ≥188° C., or ≥189° C., or ≥190° C.

In one embodiment, or a combination of two or more embodiments, each described herein, the process has an overall catalyst efficiency ≥2.5×10$^6$, or ≥2.6×10$^6$, or ≥2.8×10$^6$, or ≥3.0×10$^6$, or ≥3.2×10$^6$, or ≥3.4×10$^6$, or ≥3.6×10$^6$, or ≥3.7×10$^6$, or ≥3.8×10$^6$, or ≥3.9×10$^6$, or ≥4.0×10$^6$, or ≥4.1×10$^6$, or ≥4.2×10$^6$ [(gram interpolymer) per (gram total catalyst metal)], at an ethylene/alpha-olefin/interpolymer density from 0.860 to 0.900 g/cc, or from 0.865 to 0.890 g/cc, or from 0.868 to 0.880 g/cc (1 cc=1 cm$^3$).

In one embodiment, or a combination of two or more embodiments, each described herein, the process is run at a reactor temperature ≥155° C., or ≥160° C., or ≥165° C., or ≥170° C., or ≥175° C., or ≥180° C., or ≥185° C., or ≥186° C., or 187° C., or ≥188° C., or ≥189° C., or ≥190° C. In one embodiment, or a combination of two or more embodiments, each described herein, the process is run at a reactor temperature is ≤250° C., or ≤240° C., or ≤230° C. or ≤220° C., or ≤210° C., or ≤200° C.

The term "substituent" refers to the substitution of a hydrogen atom (—H), bonded to a carbon atom or heteroatom of a corresponding unsubstituted compound, by a substituent (R$^S$). The notation "R$^S$" refers to a heteroatom or a chemical group comprising at least one heteroatom. The term "substitution" means that at least one hydrogen atom (—H) bonded to a carbon atom or heteroatom of a corresponding unsubstituted compound is replaced by a substituent (R$^s$).

The term "heteroatom," refers to an atom other than hydrogen or carbon. The term "heteroatom group" refers to a heteroatom or to a chemical group containing one or more heteroatoms. Examples of heteroatom groups include, but are not limited to, O, S, S(O), S(O)$_2$, Si(R$^C$)$_3$, P(R$^P$)$_2$, N(R$^N$)$_2$, —N=C(R$^C$)$_2$, —Ge(R$^C$)$_2$—, or —Si(R$^C$)$_2$—, where each R$^C$ and each R$^P$ is, independently, an unsubstituted (C$_1$-C$_{30}$)hydrocarbyl or —H. and where each R$^N$ is unsubstituted (C$_1$-C$_{30}$)hydrocarbyl.

The term "—H" means a hydrogen or hydrogen radical that is covalently bonded to another atom. "Hydrogen," H, and "—H" are interchangeable, and, unless clearly specified, mean the same thing.

The term "(C$_1$-C$_{40}$)hydrocarbyl" means a hydrocarbon radical of from 1 to 40 carbon atoms, and the term "(C$_1$-C$_{40}$)hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic, and is unsubstituted or substituted by one or more R$^S$.

The term "heterohydrocarbon" refers to a molecule or molecular framework in which one or more carbon atoms are replaced with a heteroatom. The term "(C$_1$-C$_{40}$)heterohydrocarbyl" means a heterohydrocarbon radical of from 1 to 40 carbon atoms, and the term "(C$_1$-C$_{40}$)heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atoms, (2) one or two heteroatoms, or (3) a carbon atom and a heteroatom. Each (C$_1$-C$_{40}$)heterohydrocarbyl and (C$_1$-C$_{40}$)heterohydrocarbylene may be unsubstituted or substituted (by one or more R$^S$), aromatic or non-aromatic, saturated or unsaturated, straight chain or branched chain, cyclic (including mono- and poly-cyclic, fused and non-fused polycyclic), or acyclic.

The term "halogen atom" or "halogen" means the radical of a fluorine atom (F), chlorine atom (Cl), bromine atom (Br), or iodine atom (I). The term "halide" means anionic form of the halogen atom: fluoride (F—), chloride (Cl—), bromide (Br—), or iodide (I—).

Also provided is a method to determine the TGIC broadness parameter B$_{1/x}$ of a polymer composition, comprising one or more olefin-based polymers; said the method comprising the steps described in the above SOI. The method may comprise a combination of two or more embodiments as described herein.

In one embodiment, or a combination of two or more embodiments, each described herein, the composition comprises ≥50 wt %, or ≥60 wt %, or ≥70 wt %, or ≥80 wt %, or ≥85 wt % of the one or more olefin-based polymers, based on the weight of the composition, and further comprises ≥50 wt %, or ≥60 wt %, or ≥70 wt %, or ≥80 wt %, or ≥85 wt % of one olefin-based polymer, further an ethylene/alpha-olefin interpolymer.

In one embodiment, or a combination of two or more embodiments, each described herein, the composition comprises ≥90 wt %, or ≥92 wt %, or ≥94 wt %, or ≥96 wt %, or ≥98 wt %, or ≥99 wt % of the one or more olefin-based polymers, based on the weight of the composition, and further comprises ≥90 wt %, or ≥92 wt %, or ≥94 wt %, or ≥96 wt %, or ≥98 wt %, or ≥99 wt % of one olefin-based polymer, further an ethylene/alpha-olefin interpolymer.

In one embodiment, or a combination of two or more embodiments, each described herein, the composition comprises only one olefin-based polymer. In a further embodiment, the olefin-based polymer is an ethylene/alpha-olefin interpolymer.

In one embodiment, or a combination of two or more embodiments, each described herein, the support material comprises ≥10 wt %, or ≥20 wt %, or ≥30 wt %, or ≥40 wt %, or ≥50 wt %, or ≥60 wt %, or ≥70 wt %, or ≥80 wt %, or ≥85 wt % of the graphite, based on the weight of the support material.

In one embodiment, or a combination of two or more embodiments, each described herein, the support material comprises ≥90 wt %, or ≥92 wt %, or ≥94 wt %, or ≥96 wt %, or ≥98 wt %, or ≥99 wt % of the graphite, based on the weight of the support material.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus, includes the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, can be incorporated into and/or within the polymer. Typically, a polymer is stabilized with very low amounts ("ppm" amounts) of one or more stabilizers.

The term "interpolymer," as used herein, refers to polymer prepared by the polymerization of at least two different types of monomers. The term interpolymer thus includes the term copolymer (employed to refer to polymers prepared from two different types of monomers) and polymers prepared from more than two different types of monomers.

The term "olefin-based polymer," as used herein, refers to a polymer that comprises, in polymerized form, 50 wt % or a majority weight percent of an olefin, such as ethylene or propylene (based on the weight of the polymer), and optionally may comprise one or more comonomers.

The term "propylene-based polymer," as used herein, refers to a polymer that comprises, in polymerized form, a majority weight percent of propylene (based on the weight of the polymer), and optionally may comprise one or more comonomers.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "ethylene/alpha-olefin interpolymer," as used herein, refers to a random interpolymer that comprises, in polymerized form, 50 wt % or a majority weight percent of ethylene (based on the weight of the interpolymer), and an alpha-olefin.

The term, "ethylene/alpha-olefin copolymer," as used herein, refers to a random copolymer that comprises, in polymerized form, 50 wt % or a majority amount of ethylene monomer (based on the weight of the copolymer), and an alpha-olefin, as the only two monomer types.

The term "solution polymerization," as used herein, refers to a process of polymerization, in which the monomer(s), as well as the polymer produced, are dissolved in the polymerization solvent. In one embodiment, the reactor pressure is ≤1000 psig.

The term "reaction mixture," as used herein, refers to mixture comprising one or more monomer types, a solvent and a metal complex. Typically, the reaction mixture also comprises a one or more cocatalysts and hydrogen ($H_2$).

The term "Overall Catalyst Efficiency (units of 10^6 g polymer per g total catalyst metal)," as used herein, in reference to a polymerization process, refers to the production rate (for example, lb/hr) of the polymer formed during the polymerization process (or polymerization run), divided by the total feed rate (for example, lb/hr) of the catalyst metals (for example, the metal(s) from one or more metal complexes) used during the same polymerization process (or polymerization run). Typically, the polymerization is a steady state process.

The term "silane coupling agent," as used herein, refers to a compound containing at least one "Si" atom and at least one "—$CH_2$—" group, and/or and at least one "—$CH_3$" group, and which compound forms a chemical link between two materials; for example, between a polymer and an inorganic material.

The term "solar cell (or photovoltaic cell)," as used herein, refers to a device that converts solar radiation into electricity. Solar cells are typically presented in an array pattern.

The term "solar cell module (or solar panel or solar module)," as used herein, refers to a photovoltaic panel which comprises an assembly of solar cells.

The terms "laminating," "lamination," and similar terms, as used herein, refer to the process in which multiple layered materials are bonded together under conditions comprising heat and pressure, and an optional vacuum.

The terms "comprising," "including," "having," and their derivatives, are not intended to exclude the presence of any additional component, step or procedure, whether the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure, not specifically delineated or listed.

Listing of Some Composition Features
- A] A composition comprising an ethylene/alpha-olefin interpolymer that comprises the following properties:
  - a) a total unsaturation/1000C≥0.30;
  - b) a molecular weight distribution (MWD)≤3.0;
  - c) a TGIC broadness parameter $B_{1/4}$≤8.0.
- B] The composition of A] above, wherein the ethylene/alpha-olefin interpolymer has a density ≥0.860 g/cc, or ≥0.861 g/cc, or ≥0.862 g/cc, or ≥0.863 g/cc, or ≥0.864 g/cc, or ≥0.865 g/cc, or ≥0.866 g/cc, or ≥0.867 g/cc, or ≥0.868 g/cc, or ≥0.869 g/cc, or ≥0.870 g/cc (cc=1 cm³).
- C] The composition of A] or B] above, wherein the ethylene/alpha-olefin interpolymer has a density ≥0.900 g/cc, or ≥0.890 g/cc, or ≥0.888 g/cc, or ≥0.886 g/cc, or ≥0.885 g/cc, or ≥0.884 g/cc, or ≥0.883 g/cc, or ≥0.882 g/cc, or ≥0.880 g/cc, or ≥0.878 g/cc.
- D] The composition of any one of A]-C] (A] through C]) above, wherein the ethylene/alpha-olefin interpolymer has a total unsaturation/1000C≥0.32, or ≥0.35, or ≥0.40, or ≥0.45, or ≥0.50, or ≥0.52, or ≥0.54, or ≥0.56.
- E] The composition of any one of A]-D] above, wherein the ethylene/alpha-olefin interpolymer has a total unsaturation/1000C≤1.00, or ≤0.95, or ≤0.90, or ≤0.85, or ≤0.80, or ≤0.78, or ≤0.76, or ≤0.74, or ≤072, or ≤0.70.
- F] The composition of any one of A]-E] above, wherein the ethylene/alpha-olefin interpolymer further comprises a % vinyl ≥50%, or ≥52%, or ≥54%, or 56%, or ≥58%, or ≥60%, or ≥62%.
- G] The composition of any one of A]-F] above, wherein the ethylene/alpha-olefin interpolymer further comprises a % vinyl ≤100%, or ≤95%, or ≤90%, or ≤85%, or ≤80%, or ≤ or 78%≤76%, or ≤74%, or ≤72%, or ≤70%, or ≤68%, or ≤66%.
- H] The composition of any one of A]-G] above, wherein the ethylene/alpha-olefin interpolymer further comprises a product of the [(vinyl/1000C)*(Mn)] is ≥5.0×10³ (g/mol), or ≥6.0×10³ (g/mol), ≥7.0×10³ (g/mol), ≥7.5×10³ (g/mol), or ≥8.0×10³ (g/mol), or ≥8.5×10³ (g/mol), or ≥9.0×10³ (g/mol), or ≥9.5×10³ (g/mol) or ≥10×10³ (g/mol).
- I] The composition of any one of A]-H] above, wherein the ethylene/alpha-olefin interpolymer further comprises a product of the [(vinyl/1000C)*(Mn)] is ≤30×10³ (g/mol), or ≤20×10³ (g/mol), or ≤18×10³ (g/mol), or ≤16×10³ (g/mol) or ≤14×10³ (g/mol), or ≤12×10³ (g/mol).
- J] The composition of any one of A]-I] above, wherein the ethylene/alpha-olefin interpolymer further comprises a ratio of the [(vinyl/1000C)/(vinylidene/1000C)] is ≥2.0, or ≥2.2, or ≥2.4, or ≥2.6, or ≥2.8, or ≥3.0, or ≥3.1, or ≥3.2, or ≥3.3, or ≥3.4.
- K] The composition of any one of A]-J] above, wherein the ethylene/alpha-olefin interpolymer further comprises a ratio of the [(vinyl/1000C)/(vinylidene/1000C)] is ≤6.0, or ≤5.5, or ≤5.0, or ≤4.8, or ≤4.6, or ≤4.4, or ≤4.2, or ≤4.0, or ≤3.8.
- L] The composition of any one of A]-K] above, wherein the ethylene/alpha-olefin interpolymer further comprises a (vinyl/1000C) amount ≥0.30, or ≥0.32, or ≥0.34, or ≥0.36.
- M] The composition of any one of A]-L] above, wherein the ethylene/alpha-olefin interpolymer further comprises a (vinyl/1000C) amount ≤0.60, or ≤0.58, or ≤0.56, or ≤0.54.
- N] The composition of any one of A]-M] above, wherein the ethylene/alpha-olefin interpolymer further comprises a (vinylidene/1000C) amount ≥0.06, or ≥0.08, or ≥0.10.
- O] The composition of any one of A]-N] above, wherein the ethylene/alpha-olefin interpolymer further comprises a (vinylidene/1000C) amount ≤0.20, or ≤0.18, or ≤0.16.
- P] The composition of any one of A]-O] above, wherein the ethylene/alpha-olefin interpolymer further comprises a sum of [(vinyl/1000C)+(vinylidene/1000C)] ≥0.42, or ≥0.44, or ≥0.46.
- Q] The composition of any one of A]-P] above, wherein the ethylene/alpha-olefin interpolymer further comprises a sum of [(vinyl/1000C)+(vinylidene/1000C)] ≤0.61, or ≤0.60, or ≤0.59.
- R] The composition of any one of A]-Q] above, wherein the ethylene/alpha-olefin interpolymer has a melt index (I2)≥2.0 g/10 min, or ≥4.0 g/10 min, or ≥6.0 g/10 min, or ≥8.0 g/10 min, or ≥10.0 g/10 min, or ≥12.0 g/10 min, or ≥14.0 g/10 min, or ≥15.0 g/10 min.
- S] The composition of any one of A]-R] above, wherein the ethylene/alpha-olefin interpolymer has a melt index (I2)≤60 g/10 min, or ≤50 g/10 min, or ≤45 g/10 min, or ≤40 g/10 min. or ≤38 g/10 min, or ≤36 g/10 min, or ≤34 g/10 min, or ≤32 g/10 min.
- T] The composition of any one of A]-S] above, wherein the ethylene/alpha-olefin interpolymer has an I10/I2≥5.0, or ≥5.5, or ≥6.0, or ≥6.2, or ≥6.4, or ≥6.6, or ≥6.8, or ≥7.0, or ≥7.2, or ≥7.4, or ≥7.6.
- U] The composition of any one of A]-T] above, wherein the ethylene/alpha-olefin interpolymer has an I10/I2≤30.0, or ≤25.0, or ≤20.0, or ≤15.0, or ≤10.0, or ≤9.0, or ≤8.8, or ≤8.6, or ≤8.4, or ≤8.2, or ≤8.0.
- V] The composition of any one of A]-U] above, wherein the ethylene/alpha-olefin interpolymer has a number average molecular weight Mn≥12,000 g/mol, or ≥14,000 g/mol, or ≥16,000 g/mol, or ≥18,000 g/mol, or ≥20,000 g/mol, or ≥22,000 g/mol, or ≥24,000 g/mol.
- W] The composition of any one of A]-V] above, wherein the ethylene/alpha-olefin interpolymer has a number average molecular weight Mn≤50,000 g/mol, or ≤45,000 g/mol, or ≤40,000 g/mol, or ≤38,000 g/mol, or ≤36,000 g/mol, or ≤34,000 g/mol, or ≤32,000 g/mol, or ≤30,000 g/mol.
- X] The composition of any one of A]-W] above, wherein the ethylene/alpha-olefin interpolymer has a weight average molecular weight Mw≥38,000 g/mol, or ≥40,000 g/mol, or ≥42,000 g/mol, or ≥44,000 g/mol, or ≥46,000 g/mol, or ≥48,000 g/mol, or ≥50,000 g/mol.
- Y] The composition of any one of A]-W] above, wherein the ethylene/alpha-olefin interpolymer has a weight average molecular weight Mw≤80,000 g/mol, or ≤75,000 g/mol, or ≤70,000 g/mol, or ≤68,000 g/mol, or ≤66,000 g/mol, or ≤64,000 g/mol, or ≤62,000 g/mol, or ≤60,000 g/mol.
- Z] The composition of any one of A]-Y] above, wherein, the ethylene/alpha-olefin interpolymer has a molecular weight distribution (MWD=Mw/Mn)≥1.6, or ≥1.7, or ≥1.8, or ≥1.9, or ≥2.0.
- AA] The composition of any one of A]-Z] above, wherein the ethylene/alpha-olefin interpolymer has a molecular weight distribution MWD≤2.9, or ≤2.8, or ≤2.7, or ≤2.6, or ≤2.5, or ≤2.4, or ≤2.3, or ≤2.2.

BB] The composition of any one of A]-AA] above, wherein, for the ethylene/alpha-olefin interpolymer, the alpha-olefin is a $C_3$-$C_{20}$ alpha-olefin, and further a $C_3$-$C_{10}$ alpha-olefin.

CC] The composition of any one of A]-BB] above, wherein, for the ethylene/alpha-olefin interpolymer, the alpha-olefin is selected from propylene, 1-butene, 1-pentene, 1-hexene or 1-octene, and further propylene, 1-butene or 1-octene, and further 1-butene or 1-octene, and further 1-octene.

DD] The composition of any one of A]-CC] above, wherein the ethylene/alpha-olefin interpolymer is an ethylene/alpha-olefin copolymer.

EE] The composition of any one of A]-DD] above, wherein the ethylene/alpha-olefin interpolymer is selected from the following: an ethylene/propylene copolymer, an ethylene/butene copolymer, or an ethylene/octene copolymer, and further an ethylene/butene copolymer, or an ethylene/octene copolymer, and further an ethylene/octene copolymer.

FF] The composition of any one of A]-EE] above, wherein the composition comprises ≥50.0 wt %, or ≥55.0 wt %, or ≥60.0 wt %, or ≥65.0 wt %, or ≥70.0 wt %, or ≥75.0 wt %, or ≥80.0 wt %, or ≥85.0 wt %, or ≥90.0 wt %, or ≥92.0 wt %, or ≥94.0 wt % of the ethylene/alpha-olefin interpolymer, based on the weight of the composition.

GG] The composition of any one of A]-FF] above, wherein the composition comprises ≥95.0 wt %, or ≥95.5 wt %, or ≥96.0 wt %, or ≥96.5 wt %, or ≥97.0 wt %, or ≥97.5 wt %, or ≥98.0 wt %, or ≥98.1 wt % of the ethylene/alpha-olefin interpolymer, based on the weight of the composition.

HH] The composition of any one of A]-GG] above, wherein the composition comprises ≤100.0 wt %, or ≤99.8 wt %, ≤99.6 wt %, or ≤99.4 wt %, or ≤99.2 wt %, or ≤99.0 wt %, or ≤98.8 wt %, or ≤98.6 wt %, or ≤98.4 wt %, or ≤98.3 wt % of the ethylene/alpha-olefin interpolymer, based on the weight of the composition.

II] The composition of any one of A]-HH] above, wherein the composition further comprises a second ethylene/alpha-olefin interpolymer that differs from the ethylene/alpha-olefin interpolymer in one or more polymer properties, and further one or more properties selected from comonomer content, I2, I10/I2, Mn, Mw, Mz, MWD, or any combination thereof, and further, in one or more properties selected from Mn, Mw, Mz, MWD, or any combination thereof.

JJ] The composition of II] above, wherein the second ethylene/alpha-olefin interpolymer has a density from 0.860 to 0.890 g/cc, or from 0.865 to 0.888 g/cc, or from 0.865 to 0.885 g/cc.

KK] The composition of II] or JJ] above, wherein the second ethylene/alpha-olefin interpolymer has a melt index (I2) from 0.5 to 50 g/10 min, or from 1.0 to 20.0 g/10 min. or from 5.0 to 10.0 g/10 min.

LL] The composition of any one of II]-KK] above, wherein, for the second ethylene-/alpha-olefin interpolymer, the alpha-olefin is a $C_3$-$C_{20}$ alpha-olefin, and further a $C_3$-$C_{10}$ alpha-olefin.

MM] The composition of any one of II]-LL] above, wherein, for the second ethylene/alpha-olefin interpolymer, the alpha-olefin is selected from propylene, 1-butene, 1-pentene, 1-hexene or 1-octene, and further propylene, 1-butene or 1-octene, and further 1-butene or 1-octene, and further 1-octene.

NN] The composition of any one of II]-MM] above, wherein the second ethylene/alpha-olefin interpolymer is an ethylene/alpha-olefin copolymer.

OO] The composition of any one of II]-NN] above, wherein the second ethylene/alpha-olefin interpolymer is selected from the following: an ethylene/propylene copolymer, an ethylene/butene copolymer, or an ethylene/octene copolymer, and further an ethylene/butene copolymer, or an ethylene/octene copolymer, and further an ethylene/octene copolymer.

PP] The composition of any one of A]-OO] above, wherein the TGIC broadness parameter $B_{1/4}$ is ≤7.5, or ≤7.0, or ≤6.5, or ≤6.0, or ≤5.5, or ≤5.0, or ≤4.8, or ≤4.6, or ≤4.4, or ≤4.2, or ≤4.0, or ≤3.8.

QQ] The composition of any one of A]-OO] above, wherein the TGIC broadness parameter $B_{1/4}$ is ≥1.5, or ≥2.0, or ≥2.2, or ≥2.4, or ≥2.6, or ≥2.8, or ≥3.0, or ≥3.2.

[RR] The composition of any one of II]-QQ] above, wherein the composition further comprises a peroxide and a silane coupling agent.

SS] The composition of any one of A]-RR] above, wherein the weight ratio of the peroxide to the silane coupling agent is ≥0.5, or ≥1.0, or ≥1.5, or ≥2.0, or ≥2.5, or ≥3.0, or ≥3.5, or ≥4.0.

TT] The composition of any one of A]-SS] above, wherein the weight ratio of the peroxide to the silane coupling agent is ≤7.0, or ≤6.5, or ≤6.0, or ≤5.5, or ≤5.0, or ≤4.5.

UU] The composition of any one of A]-TT] (A through TT) above, wherein the composition further comprises a crosslinking coagent.

VV] The composition of UU] above, wherein the crosslinking coagent is present in an amount ≥0.05 wt %, or ≥0.10 wt %, or ≥0.15 wt %, or ≥0.20 wt %, or ≥0.25 wt %, or ≥0.30 wt %, or ≥0.35 wt %, or ≥0.40 wt %, or ≥0.45 wt %, or ≥0.50 wt %, based on the weight of the composition.

WW] The composition of UU] or VV] above, wherein the crosslinking coagent is present in an amount ≤3.00 wt %, or ≤2.50 wt %, or ≤2.00 wt %, or ≤1.50 wt %, or ≤1.00 wt %, or ≤0.80 wt %, or ≤0.70 wt %, or ≤0.60 wt %, based on the weight of the composition.

XX] The composition of any one of UU]-WW] above, wherein the weight ratio of the peroxide to the coagent is ≥0.5, or ≥0.8, or ≥1.0, or ≥1.1, or ≥1.2, or ≥1.3, or ≥1.4, or ≥1.5, or ≥1.6, or ≥1.8.

YY] The composition of any one of UU]-XX] above, wherein the weight ratio of the peroxide to the coagent is ≤3.0, or ≤2.8, or ≤2.6, or ≤2.4, or ≤2.3, or ≤2.2, or ≤2.0.

ZZ] The composition of any one of UU]-YY] above, wherein the weight ratio of the coagent to the silane coupling agent is ≥1.0, or ≥1.2, or ≥1.4, or ≥1.6, or ≥1.8, or ≥2.0.

A3] The composition of any one of UU]-ZZ] above, wherein the wherein the weight ratio of the coagent to the silane coupling agent is ≤3.6, or ≤3.4, or ≤3.2, or ≤3.0, or ≤2.8, or ≤2.6, or ≤2.4.

B3] The composition of any one of A]-A3] above, wherein the wherein the composition comprises ≥0.05 wt %, or ≥0.10 wt %, or ≥0.15 wt %, or ≥0.20 wt %, or ≥0.25 wt %, or ≥0.30 wt %, or ≥0.35 wt %, or ≥0.40 wt %, or ≥0.45 wt %, or ≥0.50 wt %, or ≥0.55 wt %, or ≥0.60 wt % of the peroxide, based on the weight of the composition.

C3] The composition of any one of A]-B3] above, wherein the wherein the composition comprises ≤5.00 wt %, or ≤4.50 wt %, or ≤4.00 wt %, or ≤3.50 wt %, or ≤3.00 wt %, or ≤2.50 wt %, or ≤2.00 wt %, or ≤1.50 wt %, or ≤1.00 wt % of the peroxide, based on the weight of the composition.

D3] The composition of any one of A]-C3] above, wherein the wherein the composition comprises ≥0.05 wt %, or ≥0.10 wt %, or ≥0.15 wt %, or ≥0.20 wt %, of the silane coupling agent, based on the weight of the composition.

E3] The composition of any one of A]-D3] above, wherein the wherein the composition comprises ≤3.00 wt %, or ≤2.50 wt %, or ≤2.00 wt %, or ≤1.50 wt %, or ≤1.00 wt %, or ≤0.80 wt %, or ≤0.60 wt % of the silane coupling agent, based on the weight of the composition.

F3] The composition of any one of A]-E3] above, wherein the composition comprises 99.0 wt %, or ≥99.1 wt %, or ≥99.2 wt %, or ≥99.3 wt % of the sum of the interpolymer, the peroxide and the silane coupling agent, based on the weight of the composition.

G3] The composition of any one of A]-F3] above, wherein the composition comprises ≤100.0 wt %, or ≤99.9 wt %, ≤99.8 wt %, or ≤99.7 wt %, or ≤99.6 wt %, or ≤99.5 wt % of the sum of the interpolymer, the peroxide and the silane coupling agent, based on the weight of the composition.

H3] The composition of any one of A]-G3] above, wherein the composition further comprises at least one additive selected from UV stabilizers, antioxidants or combinations thereof.

I3] The composition of H3] above, wherein the at least one additive is present in an amount ≥0.01 wt %, or ≥0.02 wt %, or ≥0.03 wt %, or ≥0.04 wt %, or ≥0.06 wt %, or ≥0.08 wt %, or ≥0.10 wt %, based on the weight of the composition.

J3] The composition of H3] or I3] above, wherein the at least one additive is present in an amount ≤2.00 wt %, or ≤1.50 wt %, or ≤1.00 wt %, or ≤0.80 wt %, or ≤0.60 wt %, or ≤0.40 wt %, or ≤0.20 wt %, based on the weight of the composition.

K3] A crosslinked composition formed from the composition of any one of A-J3] above.

L3] The composition of any one of K3] above, wherein the composition has a "MH-ML" value ≥5.00, or ≥5.10, or ≥5.15, or ≥5.20≥5.22, or ≥5.24, or ≥5.26, or ≥5.28.

M3] The composition of K3] or L3] above, wherein the composition has a Gel content (4+12 min)≥84%, or ≥85%, or ≥86%.

N3] An article comprising at least one component formed from the composition of any one of A]-M3] above.

O3] The article of N3], wherein the article is a film, and further an extruded film and/or a cast film, and further an extruded film.

P3] The article of N3], wherein the article is a solar cell module.

Q3] A process of forming a solar cell module, said process comprising laminating an array of solar cells between two film layers, and wherein each film layer is, independently, formed from the composition of any one of A]-M3] above.

R3] The process of Q3] above, wherein each film layer is formed from the same composition.

S3] A solution polymerization process to prepare an ethylene/alpha-olefin/interpolymer; said process comprising polymerizing, in one reactor, at a reactor temperature ≥150° C., a reaction mixture, comprising ethylene, an alpha-olefin, a solvent, and a metal complex selected from a) below:

a) a biphenyl phenol metal complex selected from the following Structure 1, as described above in the Summary of the Invention (SOI):

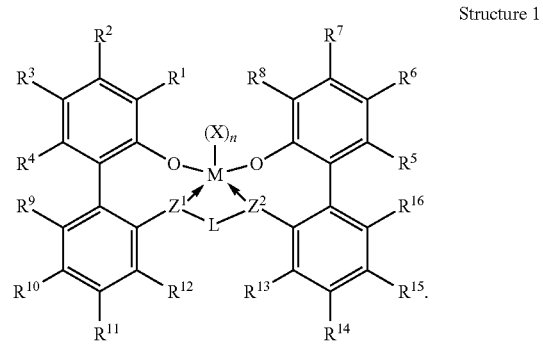

T3] The process of S3] above, wherein for Structure 1, L is either —($CH_2$)$_n$—, where n=2 to 4; —$CH_2C(R^aR^b)CH_2$—, where $R^a$ and $R^b$ are each independently ($C_1$-$C_{40}$)hydrocarbyl, ($C_1$-$C_{40}$)heterohydrocarbyl, or —H; or —$CH_2Ge(R^D)_2CH_2$— or —$CH_2Si(R^D)_2CH_2$—, where each $R^D$ is independently selected from the group consisting of —H, ($C_1$-$C_{40}$)hydrocarbyl, ($C_1$-$C_{40}$)heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C=N$—, $R^CC(O)O$—, $R^COC(O)$—, $R^CC(O)N(R^N)$—, and $(R^N)_2NC(O)$—; and each $R^C$, $R^P$, and $R^N$ in Structure 1 is independently a ($C_1$-$C_{30}$)hydrocarbyl, a ($C_1$-$C_{30}$)heterohydrocarbyl, or —H.

U3] The process of S3] or T3] above, wherein for Structure 1, each of —$Z^1$— and —$Z^2$— is —O—.

V3] The process of any one of S3]—U3] above, wherein for Structure 1, at least one of $R^1$ or $R^8$ is selected from a radical having formula (II) or a radical having formula (I).

W3] The process of any one of S3]—V3] above, wherein for Structure 1, $R^1$ and $R^8$ are identical, and selected from the group consisting of radicals having formula (I), radicals having formula (II), and radicals having formula (III).

X3] The process of any one of S3]—W3] above, wherein for Structure 1, $R^1=R^8$=a radical having formula (II).

Y3] The process of X3] above, wherein for formula (II) of Structure 1, $R^{43}=R^{46}$=an unsubstituted alkyl, further an unsubstituted ($C_1$-$C_{10}$)alkyl, further an unsubstituted ($C_1$-$C_8$)alkyl, further an unsubstituted ($C_1$-$C_6$)alkyl, further an unsubstituted ($C_1$-$C_4$)alkyl, further t-butyl.

Z3] The process of X3] or Y3] above, wherein for formula (II), wherein $R^{41}=R^{42}=R^{44}=R^{45}=R^{47}=R^{48}$=H.

A4] The process of any one of S3]—Z3] above, wherein for Structure 1, L is either —$CH_2C(R^aR^b)CH_2$—, where $R^a$ and $R^b$ are each independently ($C_1$-$C_{40}$)hydrocarbyl, ($C_1$-$C_{40}$)heterohydrocarbyl, or —H; or —$CH_2Ge(R^D)_2CH_2$— or —$CH_2Si(R^D)_2CH_2$—, where each $R^D$ is independently selected from the group consisting of —H, ($C_1$-$C_{40}$)hydrocarbyl and ($C_1$-$C_{40}$)heterohydrocarbyl.

B4] The process of any one of S3]-A4] above, wherein for Structure 1, L is selected from the following:
   i) —CH$_2$Si(R$^a$)(R$^b$)CH$_2$— or —CH$_2$Ge(R$^a$)(R$^b$)CH$_2$—, where R$^a$ and R$^b$ are each, independently, a (C$_1$-C$_{30}$)hydrocarbyl or a (C$_1$-C$_{30}$)heterohydrocarbyl;
   ii) 1,3-dimethylpropan-1,3-diyl;
   iii) bis(methylene)cyclohexan-1,2-diyl;
   iv) propan-1,3-diyl; or
   iv) butan-1,4-diyl.
C4] The process of any one of S3]—B4] above, wherein for Structure 1, L is selected from the following:
   i) —CH$_2$Si(R$^a$)(R$^b$)CH$_2$—, where R$^a$ and R$^b$ are each, independently, an unsubstituted (C$_1$-C$_{10}$)alkyl, further an unsubstituted (C$_1$-C$_8$)alkyl, further an unsubstituted (C$_1$-C$_6$)alkyl, further an unsubstituted (C$_1$-C$_4$)alkyl, further an unsubstituted (C$_1$-C$_3$)alkyl;
   ii) 1,3-dimethylpropan-1,3-diyl; or
   iii) bis(methylene)cyclohexan-1,2-diyl.
D4] The process of any one of S3]—C4] above, wherein for Structure 1, n=2, and each X is the same, and is an unsubstituted alkyl.
E4] The process of D4] above, where, each X is an unsubstituted (C$_1$-C$_3$)alkyl, further an unsubstituted (C$_1$-C$_2$)alkyl, further methyl.
F4] The process of any one of S3]-E4] above, wherein for Structure 1, R10=R15.
G4] The process of any one of S3]—F4] above, wherein for Structure 1, R10=R15=a halogen, and further F.
H4] The process of any one of S3]-G4] above, wherein for Structure 1, R3=R6.
I4] The process of any one of S3]—H4] above, wherein for Structure 1, R3=R6=an unsubstituted alkyl.
J4] The process of any one of S3]—I4] above, wherein for Structure 1, R3=R6=an unsubstituted (C$_1$-C$_{12}$)alkyl, further an unsubstituted (C$_1$-C$_{10}$)alkyl, further an unsubstituted (C$_2$-C$_8$)alkyl, further an unsubstituted (C$_4$-C$_8$)alkyl further an unsubstituted C$_8$ alkyl.
K4] The process of any one of S3]-J4] above, wherein for Structure 1, R2=R4=R5=R7=R9=R11=R12=R13=R14=R16=H.
L4] The process of any one of S3]—K4] above, wherein for Structure 1, the metal M=Zr.
M4] The process of any one of S3]-L4] above, wherein Structure 1 is selected from the following structures (1a) or (1 b):

(1a)

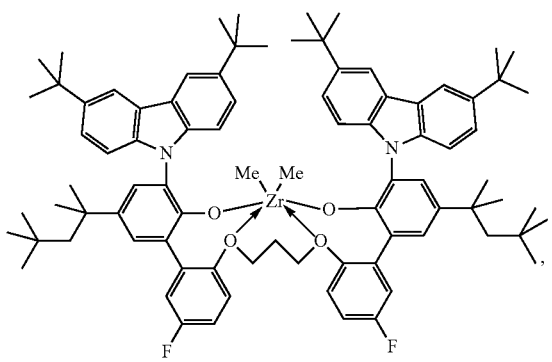

-continued (1b)

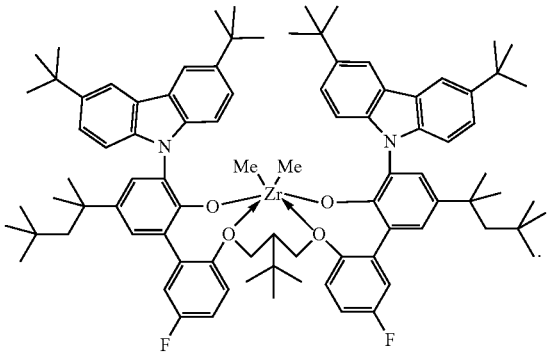

N4] The process of M4] above, wherein Structure 1 is structure (1a).
O4] The process of S3]—N4], wherein the reaction mixture further comprises a cocatalyst-1 that comprises a borate, and a cocatalyst-2 that comprises an alumoxane.
P4] The process of S3]—O4] above, wherein the process has an overall catalyst efficiency ≥2.5×10$^6$, or ≥2.6×10$^6$, or ≥2.8×10$^6$, or ≥3.0×10$^6$, or ≥3.2×10$^6$, or ≥3.4×10$^6$, or ≥3.6×10$^6$, or ≥3.7×10$^6$, or ≥3.8×10$^6$, or ≥3.9×10$^6$, or ≥4.0×10$^6$, or ≥4.1×10$^6$, or ≥4.2×10$^6$ [(gram interpolymer) per (gram total catalyst metal)], at a reactor temperature ≥155° C., or ≥160° C., or ≥165° C., or ≥170° C., or ≥175° C., or ≥180° C., or ≥185° C., or ≥186° C., or 187° C., or ≥188° C., or ≥189° C., or ≥190° C.
Q4] The process of S3]—P4] above, wherein the process has an overall catalyst efficiency ≥2.5×10$^6$, or ≥2.6×10$^6$, or ≥2.8×10$^6$, or ≥3.0×10$^6$, or ≥3.2×10$^6$, or ≥3.4×10$^6$, or ≥3.6×10$^6$, or ≥3.7×10$^6$, or ≥3.8×10$^6$, or ≥3.9×10$^6$, or ≥4.0×10$^6$, or ≥4.1×10$^6$, or ≥4.2×10$^6$ [(gram interpolymer) per (gram total catalyst metal)], at an ethylene/alpha-olefin/interpolymer density from 0.860 to 0.900 g/cc, or from 0.865 to 0.890 g/cc, or from 0.868 to 0.880 g/cc.
R4] The process of S3]-Q4] above, wherein the process is run at a reactor temperature ≥155° C., or ≥160° C., or ≥165° C., or ≥170° C., or ≥175° C., or ≥180° C., or ≥185° C., or ≥186° C., or 187° C., or ≥188° C. or ≥189° C., or ≥190° C.
S4] The process of S3]—R4] above, wherein the process is run at a reactor temperature ≤250° C., or ≤240° C., or ≤230° C., or ≤220° C. or ≤210° C., or ≤200° C.
T4] The process of any one of S3]—S4] above, wherein the reactor is selected from a continuous stirred tank reactor, a loop reactor, or a plug flow reactor (or tubular reactor), further a continuous stirred tank reactor or a loop reactor, and further continuous stirred tank reactor.
U4] The process of any one of S3]-T4] above, wherein the reaction mixture further comprises hydrogen (H$_2$).
V4] A composition comprising the ethylene/alpha-olefin interpolymer formed by the process of any one of S3]—U4] above.
W4] A method to determine the TGIC broadness parameter B$_{1/x}$ of a polymer composition, comprising one or more olefin-based polymers; said the method comprising the steps, as described in the SOI.
X4] The method of W4] above, wherein the composition comprises ≥50 wt %, or ≥60 wt %, or ≥70 wt %, or ≥80 wt %, or ≥85 wt %, or ≥90 wt %, or ≥92 wt %, or ≥94 wt %, or ≥96 wt %, or ≥98 wt %, or ≥99 wt % of the one or more olefin-based polymers, based on the weight of the composition.

Y4] The method of W4] or X4] above, wherein the composition comprises ≤100 wt %, or ≤99 wt %, or ≤98 wt %, or ≤95 wt % of the one or more olefin-based polymers, based on the weight of the composition.

Z4] The method of any one of W4]—Y4] above, wherein the composition comprises only one olefin-based polymer.

A5] The method of any one of Z4] above, wherein the olefin-based polymer is an ethylene/alpha-olefin interpolymer, and further an ethylene/alpha-olefin copolymer.

B5] The method of any one of W4]-A5] above, wherein the support material comprises ≥10 wt %, or ≥20 wt %, or ≥30 wt %, or ≥40 wt %, or ≥50 wt %, or ≥60 wt %, or ≥70 wt %, or ≥80 wt %, or ≥85 wt %, or ≥90 wt %, or ≥92 wt %, or ≥94 wt %, or ≥96 wt %, or ≥98 wt %, or ≥99 wt % of the graphite, based on the weight of the support material.

C5] The method of any one of W4]—B5] above, wherein the support material comprises ≤100 wt %, or ≥99 wt %, or ≥98 wt %, or ≥95 wt %, or ≥90 wt % of the graphite, based on the weight of the support material.

D5] The method of any one of W4]—C5] above, wherein, for step d) of the method, the temperature is increased from 25° C. to 170° C., further from 30° C. to 165° C., further from 30° C. to 160° C.

E5] The method of any one of W4]-D5] above, wherein the HDPE has a MWD from 2.3 to 3.0, or from 2.4 to 2.9, or from 2.5 to 2.8, and a weight average molecular weight, reported as polyethylene equivalent, from 100,000 to 140,000 g/mol, or from 105,000 to 135,000 g/mol, or from 110,000 to 130,000 g/mol, or from 115,000 to 125,000 g/mol.

F5] The method of any one of W4]-E5] above, wherein for the $B_{1/x}$ value, x=1.5 to 6, further x=2 to 6, further x=3 to 6, further x=4 to 6.

G5] The method of any one of W4]—F5] above, wherein the support material further comprises a filler.

Test Methods

MDR Test

Cure characteristics were measured using an Alpha Technologies Moving Die Rheometer (MDR) 2000 E, according to ASTM D5289, with a 0.5 deg arc. For each composition, the MDR was loaded with approximately 4 g of pellets. The MDR was run for 30 minutes, at 150° C., and the "time vs torque" profile was generated over the given interval. The following data were used from each MDR run: MH (dNm), or the maximum torque exerted by the MDR during the 30 minute testing interval (this usually corresponds to the torque exerted at 30-minute time point); ML (dNm), or the minimum torque exerted by the MDR during the 30 minute testing interval (this usually corresponds to the torque exerted at the beginning of the test interval); and T90 (time it takes to reach 90% of the MH value).

Gel Content Test

Each cured film prepared from a lamination process (see experimental section) was cut into small pieces, "3 mm×3 mm (around 0.5 g sample, Ws)." Then, sample was packed in a metal mesh (mesh number was 120, and weight of Wt1), which was put into a 250 ml glass bottle containing 100 ml xylene, for 24 hours, at room temperature. After that, the metal mesh and the sample was transferred into a 500 ml flask, equipped with condenser, and containing 350 ml xylene. After refluxing for 5 hours in boiling xylene, under stirring, the packed sample was removed from the xylene, placed into vacuum oven, and heated at 120° C. for 2 hours under vacuum, until the sample to reached a constant weight. Finally, the sample was weighed together with the metal mesh for weight Wt2. The gel content was calculated by the equation: Gel Content=[(Wt2−Wt1)/Ws]*100%. The xylene used is AR grade with a purity of greater than or equal to 99% and a mixture of ortho, meta, and para isomers and may contain ethyl benzene.

Gel Permeation Chromatography

The chromatographic system consisted of a PolymerChar GPC-IR (Valencia, Spain) high temperature GPC chromatograph, equipped with an internal IR5 infra-red detector (IR5). The autosampler oven compartment was set at 160° Celsius, and the column compartment was set at 150° Celsius. The columns were four AGILENT "Mixed A" 30 cm 20-micron linear mixed-bed columns. The chromatographic solvent was 1,2,4-trichloro-benzene, which contained 200 ppm of butylated hydroxytoluene (BHT). The solvent source was nitrogen sparged. The injection volume used was 200 microliters, and the flow rate was 1.0 milliliters/minute.

Calibration of the GPC column set was performed with 21 narrow molecular weight distribution polystyrene standards, with molecular weights ranging from 580 to 8,400,000, and which were arranged in six "cocktail" mixtures, with at least a decade of separation between individual molecular weights. The standards were purchased from Agilent Technologies. The polystyrene standards were prepared at "0.025 grams in 50 milliliters" of solvent, for molecular weights equal to or greater than 1,000,000, and at "0.05 grams in 50 milliliters" of solvent, for molecular weights less than 1,000,000. The polystyrene standards were dissolved at 80 degrees Celsius, with gentle agitation, for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad \text{(EQ1)},$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects, such that linear homopolymer polyethylene standard is obtained at 120,000 Mw.

The total plate count of the GPC column set was performed with decane (prepared at 0.04 g in 50 milliliters of TCB, and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max})}{\text{Peak Width at } \frac{1}{2} \text{ height}} \right)^2 \quad \text{(EQ2)}$$

where RV is the retention volume in milliliters, the peak width is in milliliters, the peak max is the maximum height of the peak, and ½ height is ½ height of the peak maximum; and $$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})}, \quad (EQ3)$$

where RV is the retention volume in milliliters, and the peak width is in milliliters. Peak max is the maximum position of the peak, one tenth height is ⅒ height of the peak maximum, and where rear peak refers to the peak tail at later retention volumes than the peak max, and where front peak refers to the peak front at earlier retention volumes than the peak max. The plate count for the chromatographic system should be greater than 18,000, and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged, septa-capped vial, via the PolymerChar high temperature autosampler. The samples were dissolved for two hours at 160° Celsius under "low speed" shaking.

The calculations of $Mn_{(GPC)}$, $Mw_{(GPC)}$, and $Mz_{(GPC)}$, were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1. Equations 4-6 are as follows:

$$Mn_{(GPC)} = \frac{\sum_{i} IR_i}{\sum_{i} (IR_i/M_{polyethylene_i})}, \quad (EQ4)$$

$$Mw_{(GPC)} = \frac{\sum_{i} (IR_i * M_{polyethylene_i})}{\sum_{i} IR_i}, \text{ and} \quad (EQ5)$$

$$Mz_{(GPC)} = \frac{\sum_{i} (IR_i * M_{polyethylene_i}^2)}{\sum_{i} (IR_i * M_{polyethylene_i})}. \quad (EQ6)$$

In order to monitor the deviations over time, a flowrate marker (decane) was introduced into each sample, via a micropump controlled with the PolymerChar GPC-IR system. This flowrate marker (FM) was used to linearly correct the pump flowrate (Flowrate(nominal)) for each sample, by RV alignment of the respective decane peak within the sample (RV(FM Sample)), to that of the decane peak within the narrow standards calibration (RV(FM Calibrated)). Any changes in the time of the decane marker peak were then assumed to be related to a linear-shift in flowrate (Flowrate (effective)) for the entire run. To facilitate the highest accuracy of a RV measurement of the flow marker peak, a least-squares fitting routine was used to fit the peak of the flow marker concentration chromatogram to a quadratic equation. The first derivative of the quadratic equation was then used to solve for the true peak position. After calibrating the system, based on a flow marker peak, the effective flowrate (with respect to the narrow standards calibration) was calculated as Equation 7: Flowrate(effective)=Flowrate (nominal)*(RV(FM Calibrated)/RV(FM Sample)) (EQ7).

Processing of the flow marker peak was done via the PolymerChar GPCOne™ Software. Acceptable flowrate correction is such that the effective flowrate should be within +/−0.7% of the nominal flowrate.

1H NMR Method

Sample Preparation. The samples were prepared by adding approximately 130 mg of sample to 3.25 g of a "50/50 by weight Tetrachlorethane-d2/Perchloroethylene with 0.001 M Cr(AcAc)$_3$," in a NORELL 1001-7, 10 mm, NMR tube. The samples were purged by bubbling N$_2$ through the solvent, via a pipette inserted into the tube, for approximately five minutes to prevent oxidation. The tube was next capped, sealed with TEFLON tape, and then soaked at room temperature overnight to facilitate sample dissolution. The samples were kept in a N$_2$ purge box during storage, before, and after preparation, to minimize exposure to O$_2$. The samples were heated, and vortexed at 115° C., to ensure homogeneity.

Data Acquisition Parameters and Data Analysis. $^1$H NMR was performed on a Bruker AVANCE 600 MHz spectrometer, equipped with a Bruker high-temperature CryoProbe and a sample temperature of 120° C. Two experiments were run to obtain spectra, a control spectrum to quantitate the total polymer protons, and a double presaturation experiment, which suppresses the intense peaks associated to the polymer chains, and enables high sensitivity spectra for quantitation of the end-groups. The control was run with ZG pulse, 4 scans, SWH 10,000 Hz, AQ 1.82 s, D$_1$ 14 s. The double presaturation experiment was run with a modified pulse sequence, lc1prf2.zz, TD 32768, 64 scans, DS 2, SWH 9,000 Hz. AQ 1.82 s, D$_1$ 2 s, D$_3$ 12 s. Unsaturation measurements were made according to the method described as below. Area under the resonance from the polymer chains (i.e., CH, CH$_2$, and CH$_3$ in the polymers) was measured from the spectrum acquired during first experiment (the control spectrum), described above. Area under the four key types of unsaturation (i.e., vinyl, vinylene, trisubstituted, and vinylidene) was measured from spectrum acquired during the second (presaturation) experiment described above. Both spectra were normalized to the area under resonance from the solvent. Moles of respective unsaturation were calculated by dividing the area under the unsaturation resonance by the number of protons contributing to that resonance. Moles of carbons in the polymers were calculated by dividing the area under the peaks for polymer chains (i.e., CH, CH$_2$, and CH$_3$ in the polymers) by two. The amount of total unsaturation was then expressed as a relative ratio of moles of total unsaturation to the moles of carbons in the polymers, with expression of the number of unsaturation per 1000 Carbon.

Melt Index

The melt index I2 of an ethylene-based polymer is measured in accordance with ASTM D-1238, condition 190° C./2.16 kg (melt index I10 at 190° C./10.0 kg). The I10/I2 was calculated from the ratio of I10 to the I2. The melt flow rate MFR of a propylene-based polymer is measured in accordance with ASTM D-1238, condition 230° C./2.16 kg.

Polymer Density

Polymer density is measured in accordance with ASTM D-792.

High Temperature Thermal Gradient Interaction Chromatography (HT-TGIC, or TGIC)—Determination of the TGIC Broadness Parameter A commercial Crystallization Elution Fractionation instrument (CEF) (Polymer Char, Spain) was used to per-form TGIC measurement (Cong, et al., Macromolecules, 2011, 44 (8), 3062-3072). The CEF instrument is equipped with an IR-5 detector. Graphite was used as the stationary phase in an HT-TGIC column (Freddy, A. Van Damme et al., U.S. Pat. No. 8,476,076; Winniford et al., U.S. Pat. No. 8,318,896). A single graphite column (250×4.6 mm) was used for the separation. Graphite was packed into a column using a dry packing technique followed by a dry packing followed by wet packing technique (Cong et al., EP 2714226B1 and the reference cited). The graphite (substantially nonporous with a high crystallinity) was obtained from Superior Graphite. The experimental parameters were as follows: top oven/transfer line/needle temperature at 150° C., dissolution temperature at 150° C., dissolution stirring setting of 2, pump stabilization time of 15 seconds, a pump flow rate for cleaning the column at 0.500 mL/m, pump flow rate of column loading at 0.300 ml/min, stabilization temperature at 150° C., stabilization time (pre-, prior to load to column) at 2.0 min, stabilization time (post-, after load to column) at 1.0 min, SF(Soluble Fraction) time at 5.0 min, cooling rate of 3.00° C./min from 150° C. to 30° C., flow rate during cooling process of 0.04 ml/min, heating rate of 2.00° C./min from 30° C. to 160° C., isothermal time at 160° C. for 10 min, elution flow rate of 0.500 mL/min, and an injection loop size of 200 microliters. The flow rate during the cooling process was adjusted according to the length of graphite column, such that all polymer fractions remained on the column at the end of the cooling cycle.

Samples were prepared by the PolymerChar autosampler at 150° C., for 120 minutes, at a concentration of 4.0 mg/ml in ODCB (defined below). Silica gel 40 (particle size 0.2-0.5 mm, catalogue number 10181-3, EMD) was dried in a vacuum oven at 160° C. For the CEF instrument, equipped with an autosampler with N2 purging capability, Silica gel 40 is packed into three "300×7.5 mm" GPC size stainless steel columns, and the Silica gel 40 columns are installed at the inlet of the pump of the CEF instrument to dry ODCB. This "ODCB dried with silica gel" is now referred to as "ODCB."

The TGIC data were processed on a PolymerChar (Spain) "GPC One" software platform. The temperature calibration was performed with a mixture of about 2 to 6 mg EICOSANE, 14.0 mg of isotactic homopolymer polypropylene iPP (molecular weight Mw reported as polyethylene equivalent of 150,000 to 190,000 g/mol, and polydispersity (Mw/Mn) of 3.6 to 4.0, wherein the iPP DSC melting temperature was measured to be 158-159° C. (DSC method described herein below). The linear homopolymer polyethylene HDPE, 14.0 mg, (zero comonomer content, weight average molecular weight (Mw) reported as polyethylene equivalent as 115,000 to 125,000 g/mol, and polydispersity of 2.5 to 2.8), was added to a "10 mL vial" filled with 7.0 mL of ODCB. The dissolution time was two hours at 160° C.

Figure 2:
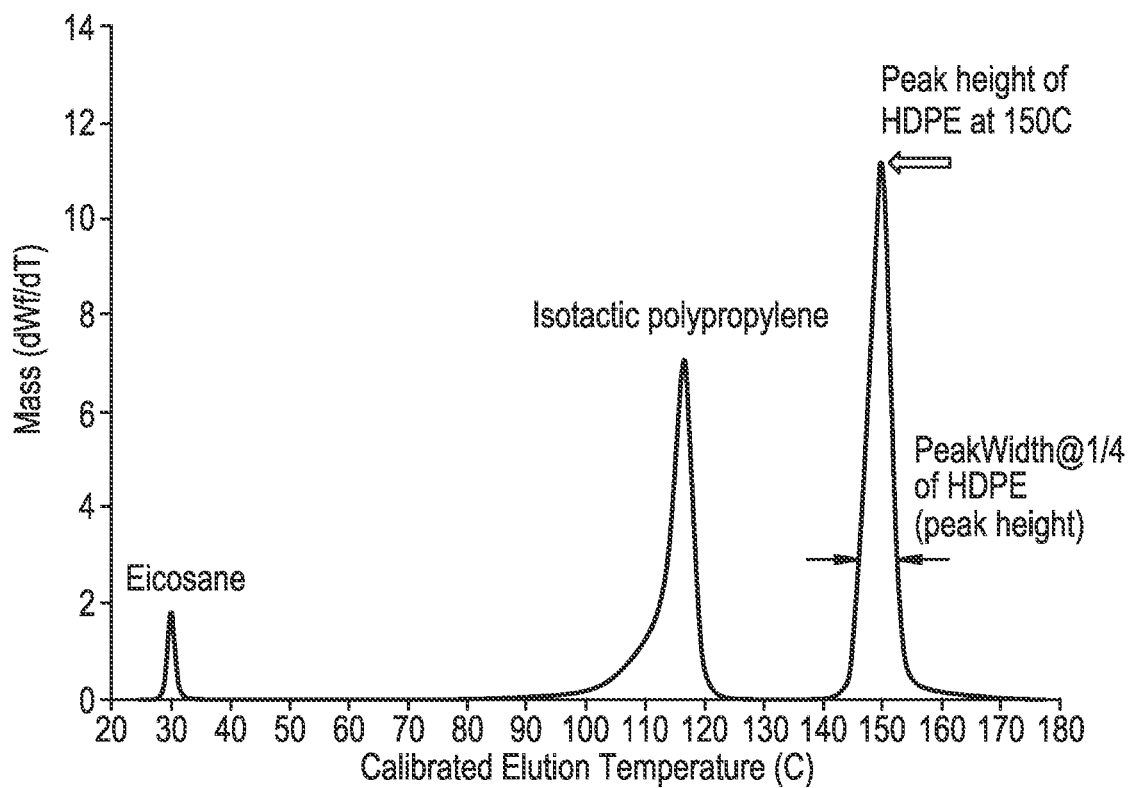
FIG. 2 is a TGIC chromatogram of the EICOSANE/iPP/HDPE mixture.

For the calibration process, a solution of EICOSANE, iPP and HDPE, was used. For elution temperatures in the range of 30° C. to 150° C., the process consisted of the following steps.
  1. Extrapolate the eluting temperature for each of the isothermal steps during elution according to the heating rate (demonstrated in FIG. 1). The solid line is experimental data. The dashed line is the extrapolation of elution temperature for two isothermal steps.
  2. Calculate the delay volume. Shift the temperature (x-axis) corresponding to the IR measurement channel chromatogram (y-axis), so that the EICOSANE peak maximum (y-axis) is coincident with the elution temperature at 30.0° C. The delay volume is calculated from the temperature difference (30° C.–the actual elution temperature of EICOSANE peak maximum) divided by the heating rate of the method, and then multiplied by the elution flow rate.
  3. Adjust each recorded elution temperature with this same delay volume adjustment.
  4. Linearly scale with the heating rate, such that the observed HDPE reference has an elution peak maximum temperature of 150.0° C., while the EICOSANE elution peak maximum temperature remains at 30.0° C. TGIC chromatogram of the EICOSANE/iPP/HDPE mixture is shown in FIG. 2.

Figure 3:
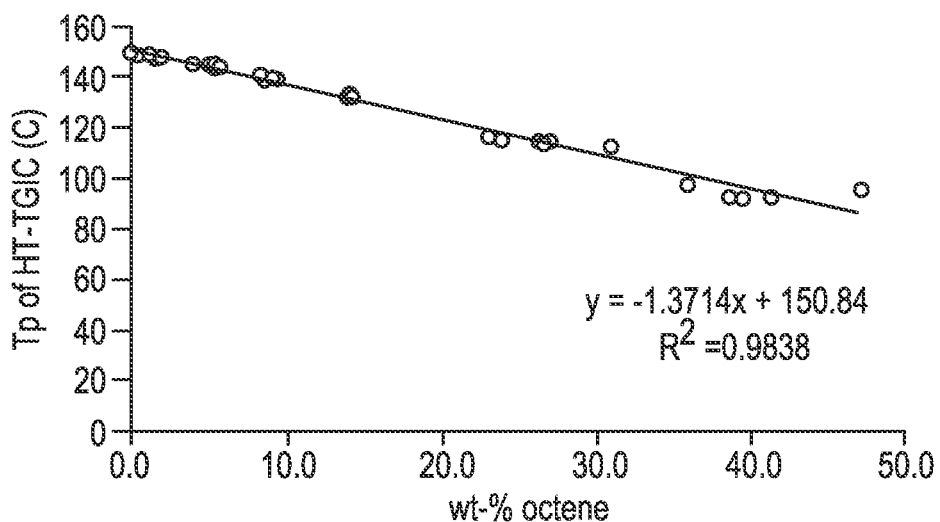
FIG. 3 depicts the correlation of elution peak temperature (Tp) of ethylene-octene copolymers versus the wt % octene.

At least 20 ethylene octene random copolymers made with a single site catalyst, and having the Mw (ethylene equivalent weight average molecular weight) in the range of 36,000 to 150,000 and polydispersity (MWD) of 2.0-2.2. The measured elution peak temperature of each ethylene octene copolymer (Tp) and octene content (wt %) of the copolymer follows the correlation specified in FIG. 3. Molecular weight distribution is measured according to the reference (Cong et al., Macromolecule, 2011, 44 (8), 3062-3072). Octene content is measured by 13C NMR according to (Li et al., U.S. Pat. No. 7,608,668 and references cited).

Data Processing for Polymer Samples of HT-TGIC

A solvent blank (pure solvent injection) was run at the same experimental conditions as the polymer samples. Data processing for polymer samples includes the following: subtraction of the solvent blank for each detector channel, temperature extrapolation as described in the calibration process, compensation of temperature with the delay volume determined from the calibration process, and adjustment in elution temperature axis to the 30° C. and 160° C. range as calculated from the heating rate of the calibration.

The chromatogram (measurement channel of the IR-5 detector) was integrated with PolymerChar "GPC One" software. A straight baseline was drawn from the visible difference, when the peak falls to a flat baseline (roughly a zero value in the blank subtracted chromatogram) at high elution temperature, and the minimum or flat region of detector signal on the high temperature side of the soluble fraction (SF).

The melting temperature of homopolymer polypropylene, specified in HT-TGIC Melting point of iPP, is determined using a differential scanning calorimeter (DSC). The temperature at the maximum heat flow rate, with respect to a linear baseline, was used as the melting point. The linear baseline was constructed from the beginning of the melting (above the glass transition temperature) and to the end of the melting. The temperature was raised from room temperature to 200° C. at 10° C./min, maintained at 200° C. for 5 min; decreased to 0° C. at 10° C./min, maintained at 0° C. for 5 min; and then the temperature was raised from 0° C. to 200° C. at 10° C./min; and the data are taken from this second heating cycle.

Calculation of the Broadness Parameter for TGIC Profile, $B_1/x$

Figure 4:
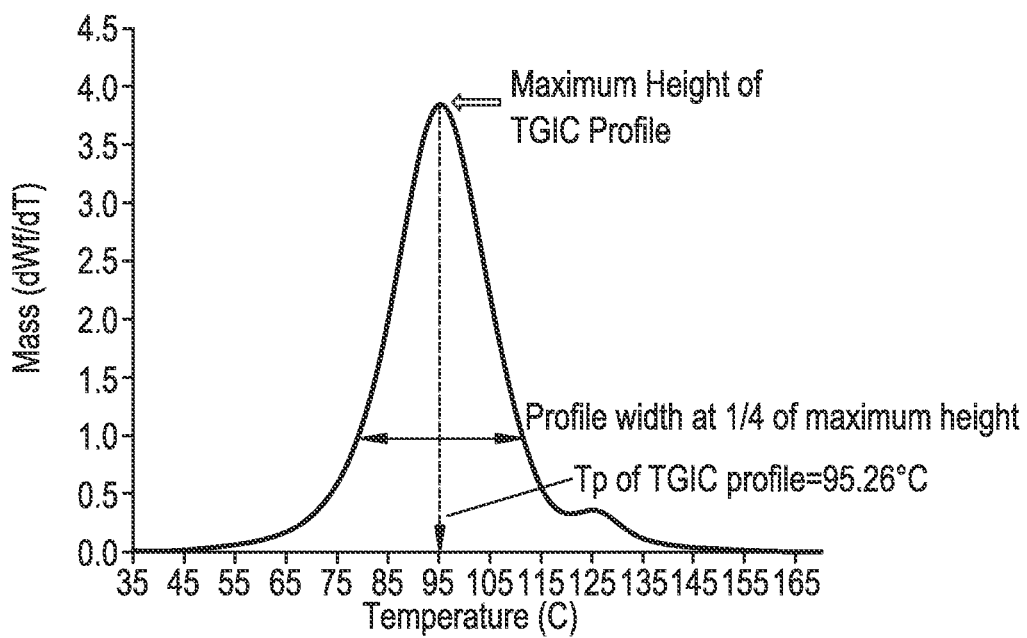
FIG. 4 is a TGIC profile of an inventive POE (POE A).
Figure 5:
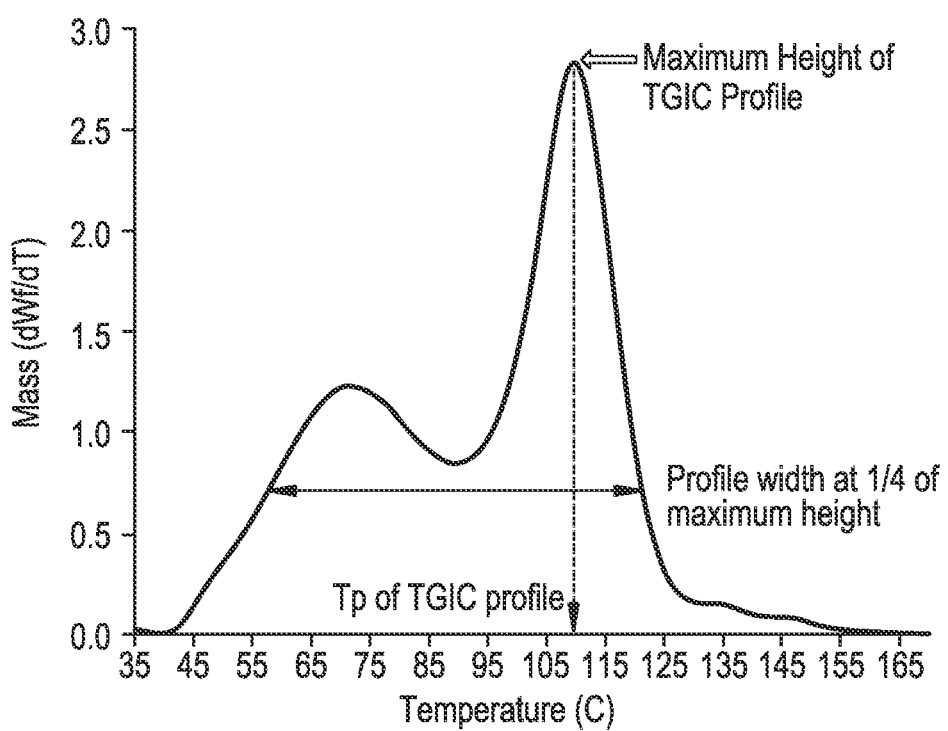
FIG. 5 is a TGIC profile of a comparative POE (POE C).

Here, a parameter, BIA was defined from TGIC measurements to quantify the breath of the comonomer distribution in both comparative and inventive samples (see, for example, FIG. 4). The following procedure describes the method of calculating the $B_{1/x}$ from the TGIC measurements.
  1. Run both the test sample and the EICOSANE/iPP/HDPE mixture in same run queue according to the TGIC method above.

2. Generate the TGIC chromatograms (dwi/dT versus elution temperature (T) profiles).
3. For the test sample, obtain the maximum height from the TGIC chromatogram (dwi/dTi vs. temp.) by searching each data point for the highest intensity from 35.0° C. to 170.0° C., the corresponding elution temperature of TGIC chromatogram at the maximum height is defined as profile temperature (Tp). In the case where the TGIC chromatogram has multiple peaks (excluding SF peak), and multiple peaks having the exact same peak height, the peak at the highest elution temperature is defined as the profile temperature (Tp). The profile width (@1/x maximum height) is defined as the temperature difference between the front temperature and the rear temperature at 1/x of the maximum height. The front temperature at the 1/x of the maximum height is searched forward from 35.0° C., while the rear temperature at the 1/x of the maximum height is searched in the reverse direction from 170.0° C.
4. Calculate of the peak width of HDPE (at elution temperature of 150.0° C.) at 1/x of HDPE peak height (PeakWidth@1/x) from EICOSANE/iPP/HDPE reference (see FIG. 2).
5. $B_{1/x}$ is then calculated based on following equation:

$$B_{1/x} = \frac{\text{Profile width}\left(\text{at } \frac{1}{x} \text{ maximum height}\right)}{PeakWidth@\frac{1}{x} \text{ of } HDPE} \times \frac{Tp}{150°C}.$$

The TGIC broadness parameter (for example, $B_{1/4}$) is an indication of the breath of the comonomer distribution of the ethylene/alpha-olefin interpolymer. A smaller $B_{1/4}$ value indicates a narrower comonomer distribution. It was discovered that a narrow comonomer distribution (smaller $B_{1/x}$) was found to be beneficial to the curing effectiveness of the POE in the PV encapsulant formulation. TGIC chromatography is an important technique to characterize the comonomer content and its distribution (see FIG. 3). Peak width (° C.) at a certain fraction of the height of the maximum (Mass intensity) peak in TGIC profile can be used to quantify the breath of the comonomer distribution. However, the absolute value of the peak width can be also be affected by chromatographic related experimental factors (Stregel, et al., "Modern size-exclusion liquid chromatography, Wiley, $2^{nd}$ edition, Chapter 3) and/or resin comonomer content. In the current case, the comonomer distribution was defined by using the $B_{1/x}$ parameters to minimize the bias from the experimental factors and the comonomer content in the polymers.

EXPERIMENTAL

Commercial Polymers and Additives

Ethylene/1-octene random copolymer: density 0.873 g/cc, 12 14 g/10 min (XUS 38669 Polyolefin Elastomer from The Dow Chemical Company). This copolymer is noted as "POE 669" in the tables below ENGAGE 8407 Polyolefin Elastomer from The Dow Chemical Company, ethylene/1-octene random copolymer: density 0.870 g/cc, 12 30 g/10 min. Noted as POE 407 in the tables below.

TBEC: tert-butylperoxy-2-ethylhexyl carbonate; LUPEROX TBEC organic peroxide from Arkema. VMMS: 3-(trimethoxysilyl)propyl-methacrylate; silane coupling agent from Dow Corning. Crosslinking coagent: triallyl isocyanurate (TAIC).

Polymer Syntheses and Properties

The interpolymers were each prepared in a one gallon polymerization reactor that was hydraulically full, and operated at steady state conditions. The catalysts and cocatalysts are listed in Table 1. The solvent, hydrogen, catalysts, and cocatalysts were fed to the reactor according to the process conditions outlined in Tables 2A-2C. The solvent was ISOPAR E, supplied by the ExxonMobil Chemical Company. The reactor temperature was measured at or near the exit of the reactor. The interpolymer was isolated and pelletized.

The POE properties are summarized in Table 3. Unsaturation measurements from 1H NMR are summarized in Table 4. TGIC results are summarized in Table 5.

TABLE 1

Catalysts and Cocatalysts

| | Description |
|---|---|
| Catalyst (CAT) | |
| BPP-A | 6',6'''-(propane-1,3-diylbis(oxy))bis(3-(3,6-di-tert-butyl-9H-carbazol-9-yl)-3'-fluoro-5-(2,4,4-trimethylpentan-2-yl)-[1,1'-biphenyl]-2-ol)dimethyl-zirconium (WO2012027448) |
| BPP-B | 6',6'''-(((diisopropylsilanediyl)bis(methylene))bis(oxy))bis(3-(3,6-di-tert-butyl-9H-carbazol-9-yl)-3'-fluoro-5-(2,4,4-trimethylpentan-2-yl)-[1,1'-biphenyl]-2-ol)dimethyl-hafnium (WO2018022975) |
| BPP-C | 6',6'''-((2-(tert-butyl)propane-1,3-diyl)bis(oxy))bis(3-(3,6-di-tert-butyl-9H-carbazol-9-yl)-3'-fluoro-5-(2,4,4-trimeihylpentan-2-yl)-[1,1'-biphenyl]-2-ol)dimethyl-zirconium (WO2016014749) |
| Cocatalyst | |
| CoCAT-1 | A mixture of methyldi($C_{14-18}$ alkyl)ammonium salts of tetrakis(pentafluorophenyl)borate, prepared by reaction of a long chain trialkylamine (Armeen ™ M2HT, available from Akzo-Nobel, Inc.), HCl and Li[B($C_6F_5$)$_4$], substantially as disclosed in U.S. Pat. No. 5,919,983, Ex. 2 (no further purification performed) (Boulder Scientific) |
| CoCAT-2 | Modified methylalumoxane (MMAO) Type 3A (no further purification performed) (Akzo Nobel) |
| CoCAT-3 | Modified methylalumoxane (MMAO)* |

*Modified with n-octyl substituents such that the methyl:n-octyl ratio is approximately 6:1 and containing 10-20% trialkyl aluminum species

TABLE 2A

Reactor Conditions

|  | Reactor Temp., °C. | Reactor Pressure, psig | Solvent, lb/hr | Ethylene, lb/hr | Octette, lb/hr | Hydrogen, seem | ethylene conversion, % |
|---|---|---|---|---|---|---|---|
| POE A | 197 | 725 | 41.87 | 3.67 | 8.56 | 3.2 | 75.8 |
| POE B | 190 | 725 | 41.87 | 3.67 | 8.81 | 3.2 | 71.1 |
| POE C | 173 | 725 | 41.85 | 3.67 | 6.81 | 3.2 | 70.4 |
| POE D | 165 | 650 | 29.01 | 4.15 | 5.85 | 154.8 | 81.7 |

TABLE 2B

Catalyst Feed Flows and Efficiency

|  | CAT 1 | CAT 1 Solution Flow, lb/hr | CAT 1 Solution Metal Conc., ppm* | CAT 2 | CAT 2 Solution Flow, lb/hr | CAT 2 Solution Metal Conc., ppm* | Overall Catalyst Efficiency, (g interpolymer/g total catalyst metal) |
|---|---|---|---|---|---|---|---|
| POE A | BPP-A | 0.42 | 2.15 | none | 0.00 | 0.00 | 5,230,000 |
| POE B | BPP-A | 0.49 | 2.15 | none | 0.00 | 0.00 | 4,280,000 |
| POE C | BPP-A | 0.23 | 5.79 | none | 0.00 | 0.00 | 3,430,000 |
| POE D | BPP-B | 0.50 | 1.39 | BPP-C | 0.24 | 3.40 | 3,560,000 |

*The "ppm" amount based on the weight of the respective catalyst feed solution.

TABLE 2C

Cocatalyst Feed Flows

|  | CoCAT 1 Solution Flow, lb/hr | CoCAT 1 Solution Conc., ppm* | CoCAT 2 Solution Flow, lb/hr | CoCAT 2 Solution Conc., ppm Al** | CoCAT 3 Solution Flow | CoCAT 3 Solution Conc., ppm Al |
|---|---|---|---|---|---|---|
| POE A | 0.46 | 30.8 | 0.39 | 34.7 | 0 | 0 |
| POE B | 0.54 | 30.8 | 0.22 | 34.7 | 0 | 0 |
| POE C | 0 | 0 | 0 | 0 | 0.40 | 74.7 |
| POE D | 0.30 | 61.5 | 0.17 | 42.0 | 0 | 0 |

*The "ppm" amount based on the weight of the co-catalyst feed solution.
**The "ppm" amount of Al based on the weight of the co-catalyst feed solution.

TABLE 3

Interpolymer Properties

|  | GPC | | | | | | | Summary | | |
|---|---|---|---|---|---|---|---|---|---|---|
|  | Density (g/cc) | I2 (dg/min) | I10/I2 | Mn (kg/mol) | Mw (kg/mol) | Mw/Mn | TGIC $B_{1/4}$ | High Unsat Level (Total unsat/1000C > 0.3) | Comonomer Distribution ($B_{1/4} \leq 8.0$) | Molecular Weight Distribution, MWD (Mw/Mn < 3) |
| POE A | 0.87 | 26.7 | 7.6 | 24 | 51 | 2.1 | 3.65 | Yes | Yes | Yes |
| POE B | 0.87 | 15.0 | 7.8 | 27 | 58 | 2.1 | 3.42 | Yes | Yes | Yes |
| POE C | 0.869 | 30.6 | 8.6 | 18 | 47 | 2.7 | 8.18 | Yes | No | Yes |
| POE D | 0.867 | 13.8 | 15.5 | 14 | 63 | 4.7 | 3.74 | Yes | Yes | No |
| POE 407 | 0.87 | 30 | 7.5 | 22 | 45 | 2.0 | 3.07 | No | Yes | Yes |
| POE 669 | 0.873 | 14 | 7.8 | 28 | 57 | 2.0 | 4.44 | No | Yes | Yes |

TABLE 4

1H NMR Unsaturation Levels

|  | % Vinyl* | Vinyl/ 1000C | Vinylene/ 1000C | Trisub/ 1000C | Vinylidene/ 1000C | Total Unsat./ 1000C** | (Vinyl/1000C)/ (Vinylidene/ 1000C) | (Vinyl/1000C) * Mn (g/mol) |
|---|---|---|---|---|---|---|---|---|
| POE C | 53.6 | 0.37 | 0.07 | 0.01 | 0.23 | 0.69 | 1.6 | $6.7 \times 10^3$ |
| POE A | 65.7 | 0.46 | 0.09 | 0.03 | 0.13 | 0.70 | 3.5 | $11 \times 10^3$ |
| POE B | 64.3 | 0.36 | 0.07 | 0.03 | 0.10 | 0.56 | 3.6 | $9.7 \times 10^3$ |
| POE D | 69.8 | 0.30 | 0.06 | 0.01 | 0.07 | 0.43 | 4.3 | $4.2 \times 10^3$ |
| POE 407 | 61.5 | 0.048 | 0.013 | 0.006 | 0.011 | 0.078 | 4.4 | $1.1 \times 10^3$ |
| POE 669 | 76.1 | 0.051 | 0.005 | 0.000 | 0.011 | 0.067 | 4.6 | $1.4 \times 10^3$ |

*%Vinyl = [(Vinyl/1000C)/(Total Unsat./1000C)] × 100
**Total Unsat./1000C = Vinyl/1000C + Vinylene/1000C + Trisub/1000C + Vinylidene/1000C

TABLE 5

TGIC Broadness Parameter at Different Peak Heights

|  | $B_{1/4}$ | $B_{1/3}$ | $B_{2/3}$ | $B_{1/5}$ | $B_{1/6}$ | $B_{2/3}/B_{1/3}$ |
|---|---|---|---|---|---|---|
| POE A | 3.65 | 3.65 | 3.68 | 3.65 | 3.66 | 1.01 |
| POE B | 3.42 | 3.44 | 3.46 | 3.42 | 3.43 | 1.01 |
| POE C | 8.18 | 8.58 | 3.26 | 7.91 | 7.72 | 0.38 |
| POE D | 3.74 | 3.67 | 3.70 | 3.88 | 4.14 | 11.01 |
| POE 407 | 3.07 | 3.02 | 2.92 | 3.10 | 3.13 | 0.96 |
| POE 669 | 4.44 | 4.76 | 4.21 | 4.26 | 4.15 | 0.88 |

POE Peroxide Curing Formulation

The POE peroxide curing compositions are shown in Tables 6 and 7. To allow the peroxide, coagent, and silane to well mixed into the formulation, the polymer pellets (98.25 wt %) were soaked with the curing additives (1.00 wt % peroxide, 0.50 wt % crosslinking coagent, and 0.25 wt % silane coupling agent) in a sealable, fluorinated, high density polyethylene bottle. The soaking (imbibing) process took place for 5 hours at 50° C., until no liquid residuals were visually seen adhering to the bottle. To ensure that the peroxide, silane, and coagent were homogenously absorbed by the pellets, the bottle was shaken for 30 seconds, every 30 minutes during the imbibing process.

Laminated Sample Fabrication

Two slightly different preparation conditions (A and B below) were used to prepare the crosslinked POE film. A PENERGY L036 laminator was used for each preparation.

A) Sample Preparation by Lamination Process with a Glass Substrate (Table 6)

Within the laminator, about "2.5 g pellet sample," imbibed with peroxide, silane, and coagent, was placed on a PTFE film (0.24 mm thickness), on top of a glass substrate (3 mm thickness). A metal frame with a "1 mm thickness" was placed around the sample, as a spacer, to make sure the crosslinked POE had a thickness of approximately 1 mm. Another PTFE film (0.24 mm thickness) was then placed on the top of sample. The lamination was conducted at a set temperature of 150° C. The heating process included the following two steps: a first step—4 minute preheating under vacuum (−100 kPa) without pressure; and a second step—12 minute with 1 bar pressure. After the lamination cycle, the crosslinked film was taken out for further gel measurements.

B) Sample Preparation by Lamination Process with a Metal Substrate (Table 7)

Within the laminator, about "2.5 g pellet sample," imbibed with peroxide, silane, and coagent, was placed on a PTFE film (0.24 mm thickness), on top of a metal substrate (1.8 mm thickness). A PTFE frame with "0.5 mm thickness" was placed around the sample, as a spacer, to make sure the crosslinked POE had a thickness of approximately 0.5 mm. Another PTFE film (0.24 mm thickness) was then placed on the top of sample. The lamination was conducted at set temperature of 150° C. The heating process included the following two steps: a first step—4 minute preheating under vacuum (−100 kPa) without pressure; and a second step—10 minute or 16 minute with 1 bar pressure. After the lamination cycle, the crosslinked film was taken out for further gel measurements.

Measurement of Adhesion to Glass After Lamination

A film (100 mm×150 mm×0.5 mm) was prepared from a compression molding of the formulated resin pellets with a Lab Tech LP-S-50 compression molder, using the following conditions: 4 minutes preheating, without pressure, at 100° C.; and 2 minutes at 100 MPa and 100° C. After the molding, the film was placed on a glass substrate (dimension of 100 mm×150 mm×3 mm), and then covered with a polyester back sheet. Then, the sample went through a lamination process (laminator SHUNHONG SH-X-1000) at 150° C., using the following conditions: 4 minutes preheating under vacuum (−100 kPa) without pressure; and 16 minutes with 1 bar pressure.

After lamination, the laminated film and back sheet was further cut and divided into three pieces, each with a "1 inch width" and a "150 mm length." An "180° peel test" was conducted on the three specimens, by pulling the laminated film and back sheet from glass substrate, using INSTRON 5565. The average of the three results was reported.

Summary of the Results

For the PV encapsulant film fabrication process, the processability of the formulated material is constrained by the shear-heating of the polymer during the extrusion process. Since the peroxide in the PV encapsulant film formulation decomposes, and crosslinks the POE at temperature above 110° C., the RPM and resin extrusion rate cannot go beyond the threshold leading to a resin melt temperature well above 110° C. It is known that higher melting index POEs (i.e., a POE with lower viscosity) can have an improved processability or throughput in the extruder, due to the lower viscosity and reduced shear-heating. In this case, both comparative and inventive samples were chosen to have relatively high melt indexes to ensure great processability of the formulation. However, for the high melt index resins, the crosslinked films typically have relatively low degrees of curing. As a result, it becomes crucial to improve the curing effectiveness for these high melt index resins.

For the curing comparison between the POEs with different unsaturation levels, the curing effectiveness of the formulations containing POEs with comparable melt index/ processability, density, MWD, and comonomer distribution were examined (see Table 6). Here. Inv. 1 was compared against Comp. 1 (POE with melting index approx. 14 dg/min), and Inv. 2 was compared against Comp. 2 (POE with melting index approx. 30 dg/min). The inventive compositions containing the high unsaturation POEs clearly showed improved (greater) MDR torque change (MH-ML), and greater gel content after the "4+12 min" vacuum lamination.

The results of Table 7 compare the curing effectiveness of the encapsulant film formulations formed from the noted POEs. The film formed from the inventive composition (POE with narrow MWD, narrow comonomer distribution, in addition to high unsaturation) delivers the best curing performance, with improved MDR torque change (MH-ML), and greater gel content after the "4+10 min" vacuum lamination, and after the "4+16 min" vacuum lamination. It is also worth noting that the inventive composition (containing the POE with a higher fraction of vinyl group to the total unsaturation, a higher vinyl/vinylidene ratio, and a narrower comonomer distribution) had good adhesion to glass.

TABLE 6

Formulations and Cure Properties

|  | Comp. 1 | Comp. 2 | Inv. 1 | Inv. 2 |
|---|---|---|---|---|
| POE 669 | 98.25 | | | |
| POE 407 | | 98.25 | | |
| POE B | | | 98.25 | |
| POE A | | | | 98.25 |
| TBEC | 1.00 | 1.00 | 1.00 | 1.00 |
| VMMS | 0.25 | 0.25 | 0.25 | 0.25 |
| TAIC | 0.50 | 0.50 | 0.50 | 0.50 |
| Total | 100 | 100 | 100 | 100 |
| ML (dNm) | 0.07 | 0.01 | 0.06 | 0.02 |
| MH (dNm) | 4.07 | 2.75 | 6.15 | 5.31 |
| MH – ML | 4.00 | 2.74 | 6.09 | 5.29 |
| T90 (min) | 11.1 | 12.1 | 12.5 | 13.5 |
| Gel content, 4 + 12 min* | 84.99% | 79.27% | 89.88% | 86.12% |

*Sample preparation by lamination process with glass substrate

TABLE 7

Formulations and Cure Properties

|  | Comp. 3 | Comp. 4 | Comp. 5 | Inv. 3 |
|---|---|---|---|---|
| POE 407 | 98.25 | | | |
| POE D | | 98.25 | | |
| POE C | | | 98.25 | |
| POE A | | | | 98.25 |
| TBEC | 1.00 | 1.00 | 1.00 | 1.00 |
| VMMS | 0.25 | 0.25 | 0.25 | 0.25 |
| TAIC | 0.50 | 0.50 | 0.50 | 0.50 |
| Total | 100 | 100 | 100 | 100 |
| ML (dNm) | 0.02 | 0.1 | 0.02 | 0.03 |
| MH (dNm) | 3.02 | 2.4 | 4.04 | 5.37 |
| MH – ML | 3.00 | 2.3 | 4.02 | 5.34 |
| T90 (min) | 12.2 | 13.3 | 13.8 | 13.5 |
| Gel content, 4 + 10 min* | 71.72% | 66.15% | 69.92% | 74.99% |
| Gel content, 4 + 16 min* | 81.80% | 81.28% | 88.20% | 92.30% |
| Glass adhesion, 4 + 16 min (N/cm) | — | — | 46.0 | 69.9 |

*Sample preparation by lamination process with metal substrate

What is claimed is:

1. A composition comprising an ethylene/alpha-olefin interpolymer that comprises the following properties:
   a) a total unsaturation/1000C≥0.30;
   b) a molecular weight distribution (MWD)≤3.0;
   c) a thermal gradient interaction chromatography (TGIC) broadness parameter $B_{1/4}$≤8.0.

2. The composition of claim 1, wherein the ethylene/alpha-olefin interpolymer has a density ≥0.860 g/cc.

3. The composition of claim 1, wherein the ethylene/alpha-olefin interpolymer has a density ≤0.900 g/cc.

4. The composition of claim 1, wherein the ethylene/alpha-olefin interpolymer further comprises a [(vinyl/1000C)*(Mn)]≥5×10³ (g/mol).

5. The composition of claim 1, wherein the ethylene/alpha-olefin interpolymer further comprises a ratio [(vinyl/1000C)/(vinylidene/1000C)]≥2.0.

6. The composition of claim 1, wherein the ethylene/alpha-olefin interpolymer further comprises a % vinyl ≥50%.

7. The composition of claim 1, wherein the composition further comprises a peroxide and a silane coupling agent.

8. The composition of claim 1, wherein the composition further comprises a crosslinking coagent.

9. An article comprising at least one component formed from the composition of claim 1.

10. The article of claim 9, wherein the article is a film.

11. The article of claim 9, wherein the article is a solar cell module.

12. A solution polymerization process to prepare an ethylene/alpha-olefin/interpolymer that comprises the following properties:
   a) a total unsaturation/1000C≥0.30;
   b) a molecular weight distribution (MWD)≤3.0;
   c) a thermal gradient interaction chromatography (TGIC) broadness parameter $B_{1/4}$≤8.0; said process comprising polymerizing, in one reactor, at a reactor temperature ≥150° C., a reaction mixture comprising ethylene, an alpha-olefin, a solvent, and a metal complex selected from a) below:
   a) a biphenyl phenol metal complex selected from the following Structure 1:

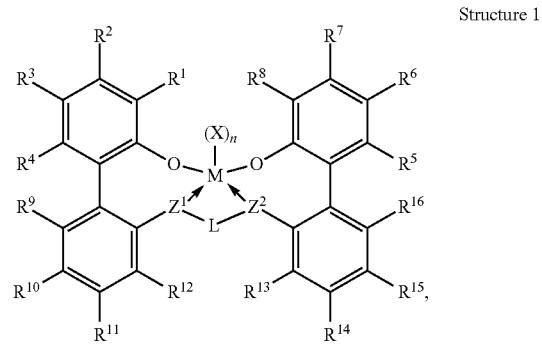

Structure 1

M is Zr or Hf, the metal being in a formal oxidation state of +2, +3, or +4;

n is 0, 1, or 2;

when n is 1, X is a monodentate ligand or a bidentate ligand;

when n is 2, each X is an independently chosen monodentate ligand;

the metal complex is overall charge-neutral;

each of —$Z^1$— and —$Z^2$— is independently selected from —O—, —S—, —N($R^N$)—, or —P($R^P$)—;

$R^1$ and $R^8$ are independently selected from the group consisting of —H, ($C_1$-$C_{40}$)-hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC (O)—, $R^CC(O)N(R)$—, $(R^C)_2NC(O)$—, halogen, radicals having formula (I), radicals having formula (II), and radicals having formula (III):

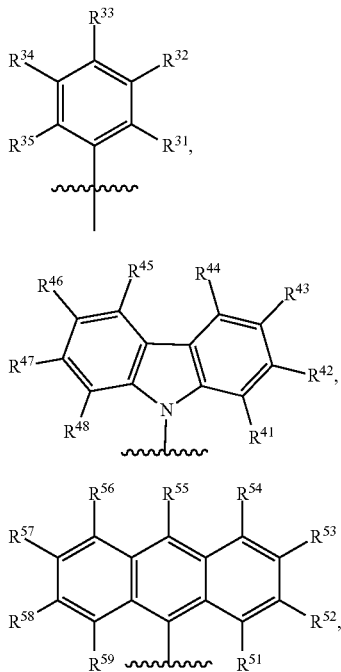

where each of $R^{31-35}$, $R^{41-48}$, and $R^{51-59}$ is independently selected from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —N=CHR$^C$, —OR$^C$, —SR$^C$, —NO$_2$, —CN, —CF$_3$, $R^CS(O)$—, $R^CS(O)_2$—, $(R^C)_2C$=N—, $R^CC(O)O$—, $R^COC(O)$—, $R^CC(O)N(R^N)$—, $(R^C)_2NC(O)$—, halogen, or —H;

each of $R^{2-7}$, $R^{9-16}$ is independently selected from $(C_1-C_{40})$hydrocarbyl, $(C_1-C_{40})$heterohydrocarbyl, —Si$(R^C)_3$, —Ge$(R^C)_3$, —P$(R^P)_2$, —N$(R^N)_2$, —N=CHR$^C$, —OR$^C$, —SR$^C$, —NO$_2$, —CN, —CF$_3$, $R^CS(O)$—, $R^CS(O)_2$—, $(R^C)_2C$=N—, $R^CC(O)O$—, $R^COC(O)$—, $R^CC(O)N(R^N)$—, $(R^C)_2NC(O)$—, halogen, or —H;

L is $(C_1-C_{40})$hydrocarbylene or $(C_1-C_{40})$heterohydrocarbylene, wherein the $(C_1-C_{40})$hydrocarbylene has a portion that comprises a 1-carbon atom to 10-carbon atom linker backbone, linking the two Z groups in Structure 1 (to which L is bonded); or the $(C_1-C_{40})$heterohydrocarbylene has a portion that comprises a 1-atom to 10-atom linker backbone, linking the two Z groups in Structure 1, wherein each of the 1 to 10 atoms of the 1-atom to 10-atom linker backbone of the $(C_1-C_{40})$heterohydrocarbylene, independently, is a carbon atom or heteroatom group, wherein each heteroatom group independently is O, S, S(O), S(O)$_2$, Si$(R^C)_2$, Ge$(R^C)_2$, P$(R^C)$, or N$(R^C)$; and each $R^C$, $R^P$, and $R^N$ in Structure 1 is independently a $(C_1-C_{30})$hydrocarbyl, a $(C_1-C_{30})$heterohydrocarbyl, or —H.

13. The process of claim 12, wherein the process has an overall catalyst efficiency ≥2.5×10$^6$ [(gram interpolymer) per (gram total catalyst metal)], at a reactor temperature ≥150° C.

14. The process of claim 12, wherein the process has an overall catalyst efficiency ≥2.5×10$^6$ [(gram interpolymer) per (gram total catalyst metal)], at an ethylene/alpha-olefin interpolymer density from 0.860 to 0.900 g/cc.

* * * * *